United States Patent
Castellucci et al.

(10) Patent No.: US 9,991,841 B2
(45) Date of Patent: Jun. 5, 2018

(54) SELF-CLEANING SOLAR POWER SYSTEM

(71) Applicant: SunPower Corporation, San Jose, CA (US)

(72) Inventors: Devin Cameron Castellucci, Woodland, CA (US); Marc Grossman, Davis, CA (US); Erik Cummins, Sacramento, CA (US); Juan Sanchez-Garcia, Woodland, CA (US); Cedric Jeanty, Davis, CA (US); Benjamin Allen Meeder, Davis, CA (US)

(73) Assignee: SunPower Corporation, San Jose, CA (US)

( * ) Notice: Subject to any disclaimer, the term of this patent is extended or adjusted under 35 U.S.C. 154(b) by 0 days. days.

(21) Appl. No.: 14/864,630

(22) Filed: Sep. 24, 2015

(65) Prior Publication Data

US 2017/0093330 A1    Mar. 30, 2017

(51) Int. Cl.
*H02S 40/10* (2014.01)
*B08B 3/10* (2006.01)
*H02S 20/32* (2014.01)

(52) U.S. Cl.
CPC ............... *H02S 40/10* (2014.12); *B08B 3/10* (2013.01); *H02S 20/32* (2014.12)

(58) Field of Classification Search
None
See application file for complete search history.

(56) References Cited

U.S. PATENT DOCUMENTS

| 8,726,458 | B1 * | 5/2014 | Mahr | F24J 2/461 |
| | | | | 15/340.1 |
| 2006/0048800 | A1 * | 3/2006 | Rast | A47L 1/02 |
| | | | | 134/56 R |
| 2009/0266353 | A1 | 10/2009 | Lee | |
| 2010/0307566 | A1 * | 12/2010 | Hinderling | F24J 2/5269 |
| | | | | 136/246 |
| 2011/0146752 | A1 * | 6/2011 | Park | H02S 40/10 |
| | | | | 136/246 |
| 2011/0259380 | A1 | 10/2011 | Lai | |
| 2013/0086761 | A1 | 4/2013 | Singh et al. | |
| 2013/0306106 | A1 | 11/2013 | Meller et al. | |

FOREIGN PATENT DOCUMENTS

WO    WO 2015/064791 A1    5/2015

OTHER PUBLICATIONS

International Search Report and Written Opinion dated Nov. 1, 2016, issued in International Application No. PCT/US2016/044554 filed Jul. 28, 2016, 13 pages.

* cited by examiner

*Primary Examiner* — Jason Ko
*Assistant Examiner* — Cristi Tate-Sims
(74) *Attorney, Agent, or Firm* — Oblon, McClelland, Maier & Neustadt, L.L.P.

(57) ABSTRACT

A photovoltaic (PV) module cleaning system can include a robotic cleaning device and a support system. The support system can be configured to provide a metered fill to the robotic cleaning device.

15 Claims, 25 Drawing Sheets

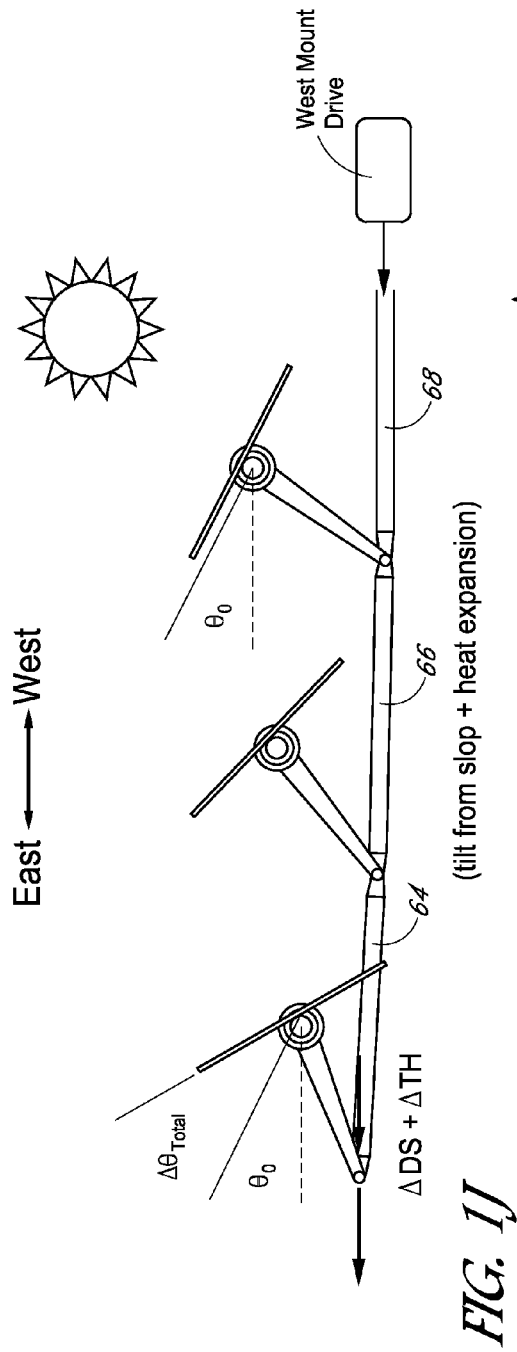
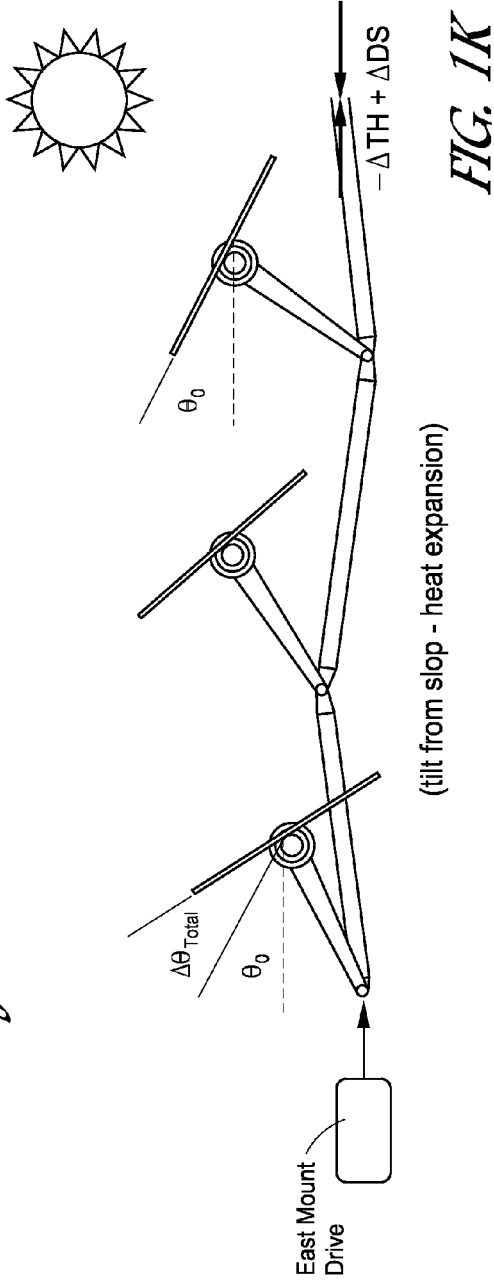
FIG. 1J
FIG. 1K

SELF-CLEANING SOLAR POWER SYSTEM

TECHNICAL FIELD

Embodiments of the subject matter described herein relate to solar energy collection systems, for example, self-cleaning solar energy collection systems.

BACKGROUND

Photovoltaic (PV) cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of, and entering into, the substrate creates electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit. Solar cells can be coupled together electrically (e.g., in series) to form a solar, or PV, module.

In the field, PV modules can collect dust, dirt, or other particulates, which can block some amount of solar radiation, which can ultimately reduce the amount of energy produced by the PV module.

BRIEF SUMMARY

An aspect of at least one of the embodiments disclosed herein includes the realization that solar energy collection systems, including larger systems such as utility scale systems and systems with a number of rows of solar energy collection modules including those that are mounted for sun tracking purposes, can be modified to include mechanisms so that the system can be "self-cleaning" In some embodiments, an automatic cleaning device can be transported to various locations throughout a solar energy collection system and launched, for example, onto rows of solar energy collection modules for automatic cleaning. In some embodiments, the cleaning device is transported with an autonomously moving transportation device. In other embodiments, the cleaning device is moved between rows of collection modules and other locations on a conveyor having a pre-determined path of travel which can be utilized by a less sophisticated conveyor system for moving a cleaning device between locations within a solar energy collection system.

Another aspect of at least one of the embodiments disclosed herein includes the realization that a solar energy collection system with cleaning device conveyor mechanism can include one or more servicing stations along the path for servicing the cleaning device. For example, the servicing station can include devices for refilling a cleaning device with cleaning materials, such as cleaning solutions, as well as refilling or recharging with power sources such as electricity. As such, the servicing stations can be provided with larger, less-portable reservoirs of service materials, such as cleaning solutions and refueling materials. In the case of electrical recharging, such a stationary servicing station can include hard-wired electrical power supply, or other forms of larger, heavier, or less portable power recharging systems.

Another aspect of at least one of the inventions disclosed herein includes the realization that alignment of a cleaning device with rows of a sun tracking energy collection system can be simplified by including at least one alignment adjustment actuator with a conveyor. For example, an alignment actuator can be configured to raise and lower the cleaning device. In such a configuration, the alignment mechanism can raise the cleaning device above an upper surface of a solar energy module so that the cleaning device can roll off of a support surface and down onto a module to be cleaned. Similarly, the adjustment device can be configured to lower a support surface below the upper surface of a solar module having been cleaned so that the cleaning mechanism can roll off of the solar module downwardly onto the support surface.

In other embodiments, the conveying device for the cleaning device can include a tilting adjustment device configured to move the support surface through a range of motion that simulates or matches a range of motion of the solar module during use. As such, the support device can be moved to a row of solar modules then tilted through a range of motion in order to be aligned with the solar module. Aligned as such, the cleaning device can roll off of the support surface and more reliably move onto a solar module to be cleaned. Optionally, the cleaning mechanism conveying device can include both vertical and tilting adjustment mechanisms to provide further precision in alignment with solar modules to be cleaned.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

FIG. 1I is a schematic diagram illustrating the calculation of an angular offset caused by mechanical slop;

FIG. 1J is a schematic elevational view of three rows of the system of FIG. 4 illustrating effects of thermal expansion in an afternoon orientation and an additive effect with angular offset caused by mechanical slop;

FIG. 1K is a schematic elevational view of the system of FIG. 1J which includes an east side mounted drive and illustrating a subtractive effect of thermal expansion with mechanical slop during an afternoon orientation;

DETAILED DESCRIPTION

Figure 1A:
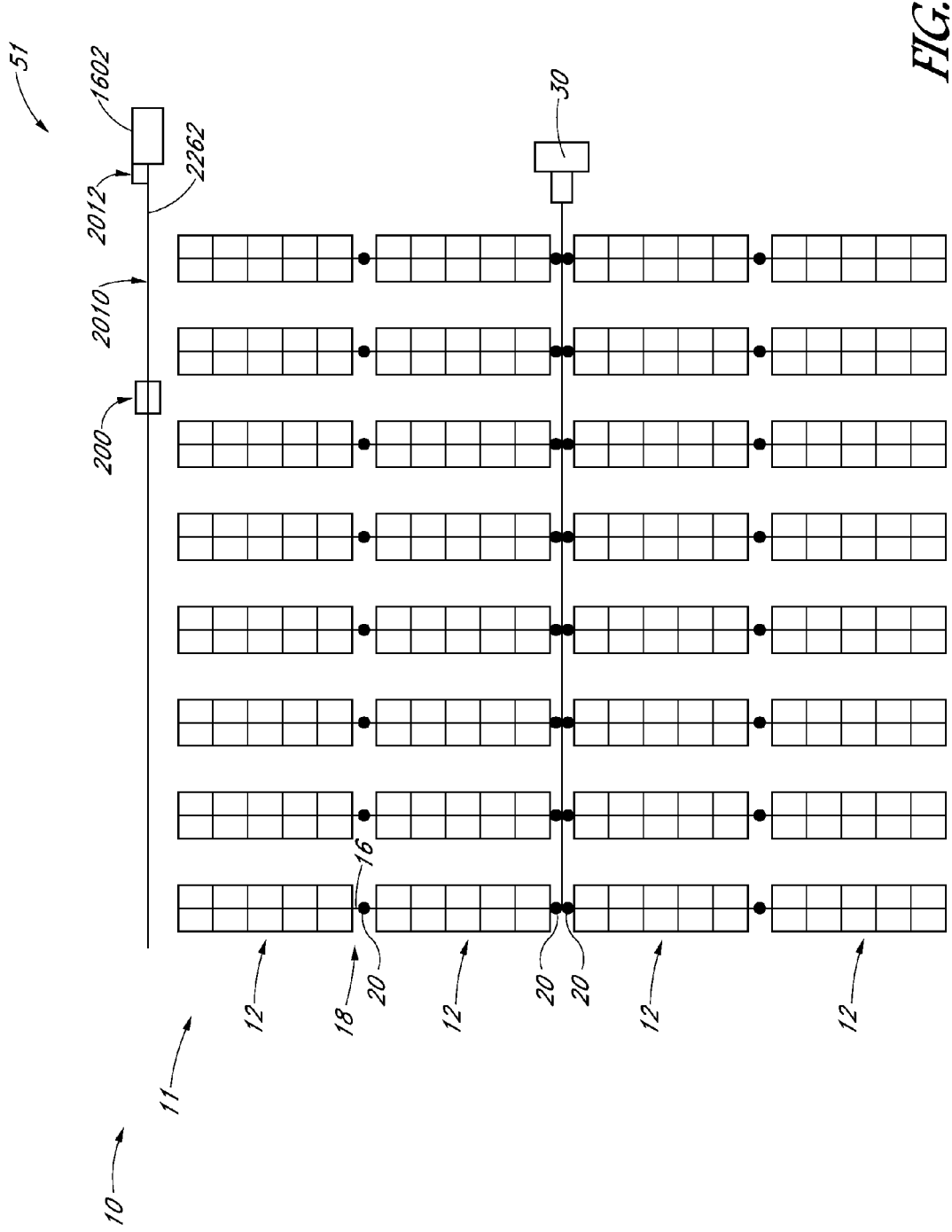
FIG. 1A is a schematic top plan view of a solar collector system, according to some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" drive module of a PV module cleaner does not necessarily imply that this drive module is the first drive module in a sequence; instead the term "first" is used to differentiate this drive module from another drive module (e.g., a "second" drive module).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled." The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit." As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

"Adjustable or Adjusted." Some elements, components, and/or features are described as being adjustable or adjusted. As used herein, unless expressly stated otherwise, "adjust" means to position, modify, alter, or dispose an element or component or portion thereof as suitable to the circumstance and embodiment. In certain cases, the element or component, or portion thereof, can remain in an unchanged position, state, and/or condition as a result of adjustment, if appropriate or desirable for the embodiment under the circumstances. In some cases, the element or component can be altered, changed, or modified to a new position, state, and/or condition as a result of adjustment, if appropriate or desired In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

The inventions disclosed herein are described in the context of non-concentrated, self-cleaning, photovoltaic solar energy collection systems. However, these inventions can be used in other contexts as well, such as cleaning systems for concentrated photovoltaic systems, thermal solar systems, concentrated thermal solar systems, etc.

In the description set forth below, a self-cleaning solar energy collection system 10 is described in the context of a solar energy system that includes plurality of solar collection modules, supported so as to be pivotally adjustable for sun-tracking purposes. Each of the modules can include a support member supporting a plurality of solar collection devices as well as wiring for connecting the various solar collection devices to each other and to other modules. The system 10 can also include various other devices and/or functionality for reducing or eliminating negative effects on total power production caused by, for example, unintended offsets of the angular orientation of the solar collection modules. For example, the solar collection system 10 of FIG. 1A can include a controller 50 for driving the associated hardware for sun-tracking purposes and/or other devices or functionality which can serve as means for compensating for angular offsets of the orientation of the solar collection modules, during sun-tracking operations, including those offsets caused by differences in thermal expansion and/or "mechanical slop" of components of the system 10, as well as other sources of such angular offsets.

Additionally, the system 10 can include a cleaning system 51 which can provide the functionality such that the system 10 can be considered a "self-cleaning" solar energy collection system.

FIG. 1A illustrates the solar collection system 10, which can be considered an electricity farm. The solar collection system 10 includes a solar collector array 11 which includes a plurality of solar collection modules 12. Each of the solar collection modules 12 can include a plurality of solar collecting devices 14 (e.g., solar cells) incorporated into a laminate and encircled by a peripheral frame, the module 12 supported by a drive shaft or torque tube 16. Each of the torque tubes 16 are supported above the ground by a support assembly 18. Each of the support assemblies 18 can include a pile and a bearing assembly 20.

With continued reference to FIG. 1A, the system 10 can also include a tracking drive 30 connected to the torque tube 16 and configured to pivot the torque tube 16 so as to cause the collector devices 14 to track the movement of the sun. In the illustrated embodiment, the torque tubes 16 are arranged generally horizontally and the modules 12 can be connected to each other and the torque tubes 16, as more fully described in U.S. patent application Ser. No. 13/176,276, filed Jul. 5, 2011, the entire contents of which is hereby expressly incorporated by reference. However, inventions disclosed herein can be used in the context of other types of arrangements. For example, the system 10 can include a plurality of modules 12 that are arranged such that the torque tubes 16 are inclined relative to horizontal, wherein the torque tubes 16 are not connected in an end to end fashion, such as the arrangement illustrated and disclosed in U.S. Patent Publication No. 2008/0245360. The entire contents of the 2008/0245360 patent publication, as well as the entire contents of the U.S. patent application Ser. No. 13/631,782 are hereby expressly incorporated by reference. Further, the inventions disclosed herein can be used in conjunction with the systems that provide for controlled tilting about two axes, although not illustrated herein.

Additionally, the solar collection devices 14 can be in the form of thermal solar collection devices, concentrated photovoltaic devices, or concentrated thermal solar collection devices. In the illustrated embodiment, the solar collection devices 14 are incorporated into the form of non-concentrated, photovoltaic modules 12.

Figure 1B:
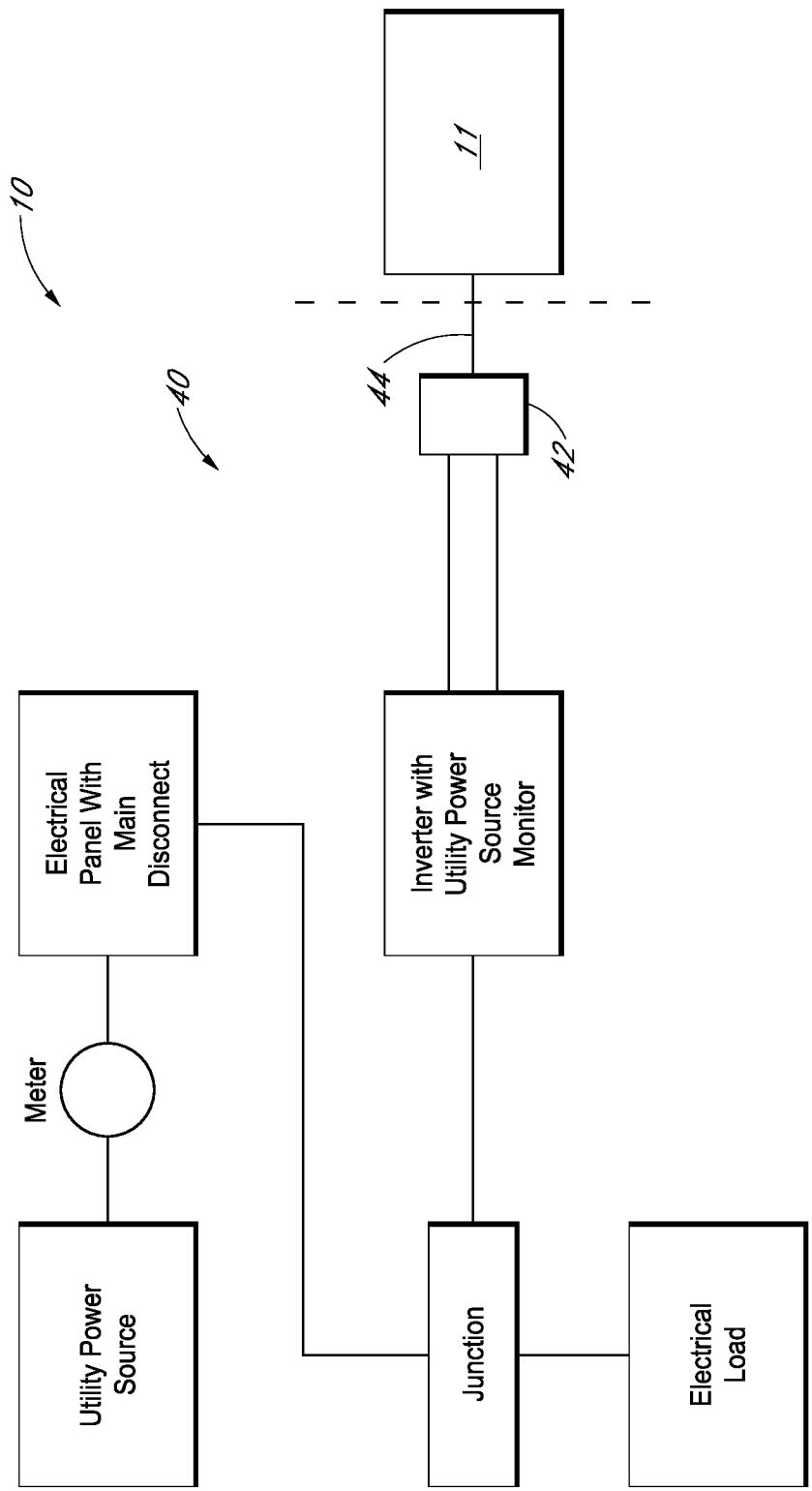
FIG. 1B is a schematic diagram of the system illustrated in FIG. 1 illustrating optional electrical connections to the solar energy collector system with various electrical components.

With reference to FIG. 1B, solar collection system 10 can further include an electrical system 40 connected to the array 11. For example, the electrical system 40 can include the array 11 as a power source connected to a remote connection device 42 with power lines 44. The electrical system 40 can also include a utility power source, a meter, an electrical panel with a main disconnect, a junction, electrical loads, and/or an inverter with the utility power source monitor. The electrical system 40 can be configured and can operate in accordance with the descriptions set forth in U.S. Patent Publication No. 2010/0071744, the entire contents of which is hereby expressly incorporated by reference.

Figure 1C:
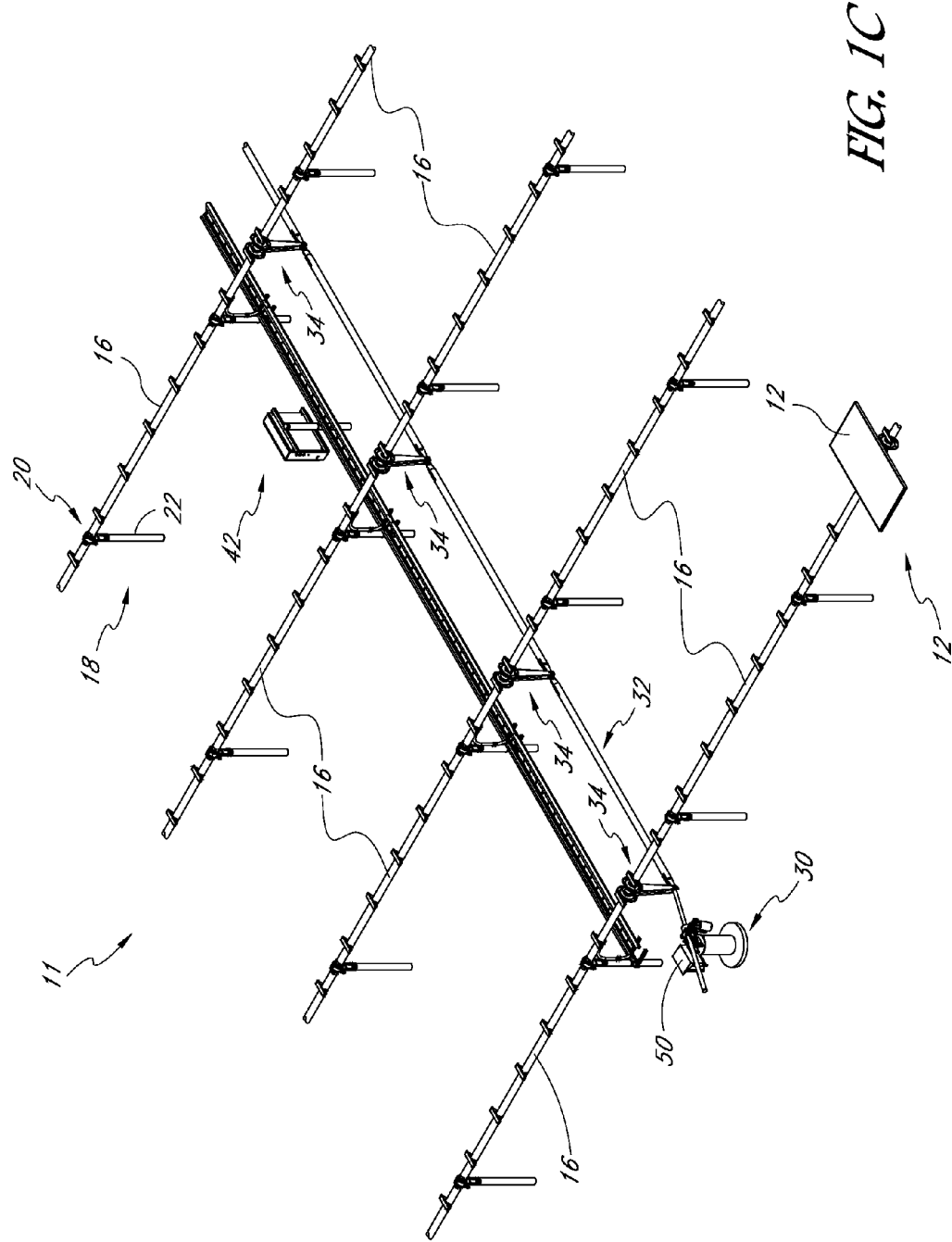
FIG. 1C is a perspective view of the solar energy collection system at FIG. 1, illustrating a plurality of piles mounted to the ground and supporting the plurality of torque tubes with a sun tracking drive, also known as a "ganged" sun tracking drive system, in accordance with an embodiment.

FIG. 1C illustrates the array 11 with all but one of the modules removed. As shown in FIG. 1C, each of the support assemblies 18 includes the bearing 20 supported at the upper end of a pile 22. The torque tube 16 can be of any length and can be formed in one or more pieces. The spacing of the piles 22 relative to one another, can be determined based on the desired limits on deflection of the torque tubes 16 between the support structures 18, wind loads, shading, and other factors. The spacing of the piles 22 also controls the spacing of the torque tubes 16 and the spacing of the modules 12. The ratio of the total area of all of the upper surfaces of the modules 12 (when in a "noon" position) divided by the total area occupied by the modules 12 (including all of the gaps) is known as the "Ground Coverage Ratio" (GCR). Larger gaps between the modules 14 result in a lower GCR, but also reduce inter-row shading and thus reduce the amount of time during which backtracking is needed to avoid inter-row shading.

The tilt drive 30 can include a drive strut 32 coupled with the torque tube 16 in a way that pivots the torque tube 16 as the drive strut 32 is moved axially along its length. The drive strut 32 can be connected with the torque tube 16 with torque arm assemblies 34. In the illustrated embodiment, the torque arm assemblies 34 disposed at an end of each of the torque tube 16. Additionally, the array 11 can include an electrical wire tray 60 supported by one or more of the piles 22, or by other means.

Figure 1D:
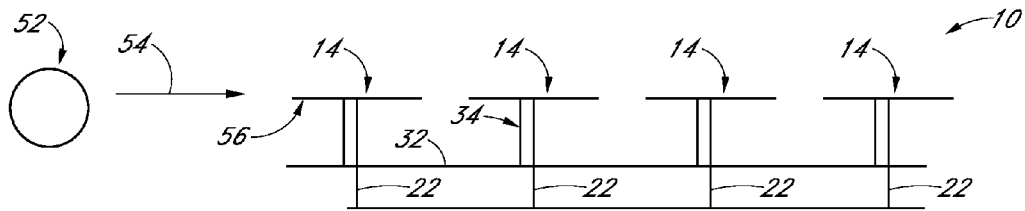
FIG. 1D is a schematic, southerly facing, elevational view of four rows of a sun tracking solar collection system in which the four rows are tiled with a common drive.

FIGS. 1D-1H schematically illustrate sun-tracking movements of the modules 12 over the course of the daylight portion of one day. Specifically, FIG. 1D illustrates the system 10 oriented in a "noon" position. However, as shown in FIG. 1D, the sun 52 is on the eastward horizon, i.e., sunrise. As the sun rises, sunlight 54 from the sun 52 approaches the modules 12 along a direction essentially parallel to the upper surfaces of the modules 12. The modules 12, however, are maintained in a direction pointing directly upward ("noon"), so as to avoid the eastward module 56 from casting a shadow on the adjacent, westward positioned modules 12.

Figure 1E:
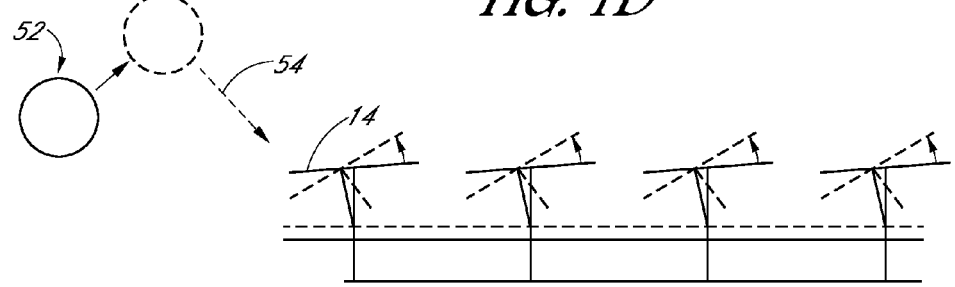
FIG. 1E is a schematic view of the system of FIG. 1D, illustrating a back tracking movement of the system as the sun rises, the initial position indicated in solid line, a subsequent position illustrated in dotted line.

With reference to FIG. 1E, as the sun 52 rises from the sunrise position illustrated in solid line to a position later in the morning, illustrated in dash line, the controller 50 operates the drive 30 to tilt the modules 12 in a backtracking motion. Specifically, during a backtracking motion in the morning, the modules 12 are gradually tilted eastwardly, as the sun 52 rises along a westerly trajectory.

The controller 50 performs calculations for controlling the drive 30 so as to orient the modules 12 as closely as possible to an orientation perpendicular to the sunlight 54, without casting a shadow on adjacent modules 12. In other words, the controller 50 causes the modules 12 to rotate through a range of non-optimal orientations, which produces less power than a perpendicular orientation, so as to avoid casting shadows which have a greater detrimental effect on total power output of the system 10.

Figure 1F:
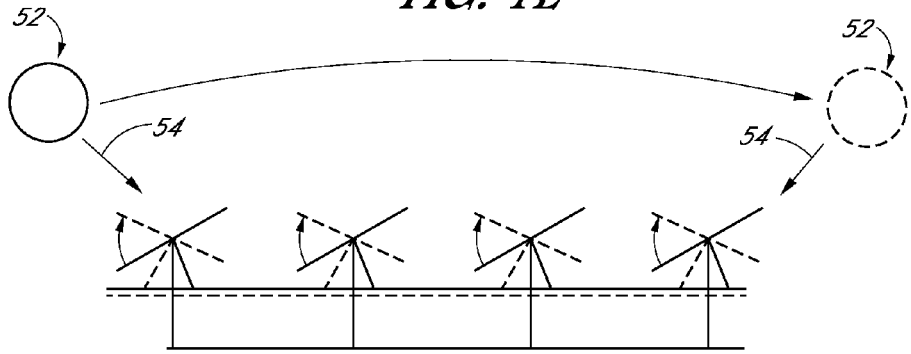
FIG. 1F is a schematic elevational view of the system in FIG. 1E, illustrating a forward tracking movement of the system during midday.

With reference to FIG. 1F, as the sun 52 moves to a position at which shadows can no longer be cast by any of the modules 12 onto an adjacent module 14, the modules 12 are tilted through a forward tracking movement, following the movement of the sun 52 such that the modules 12 face a direction as close as possible to perpendicular to sunlight 54 from the sun 52.

Figure 1G:
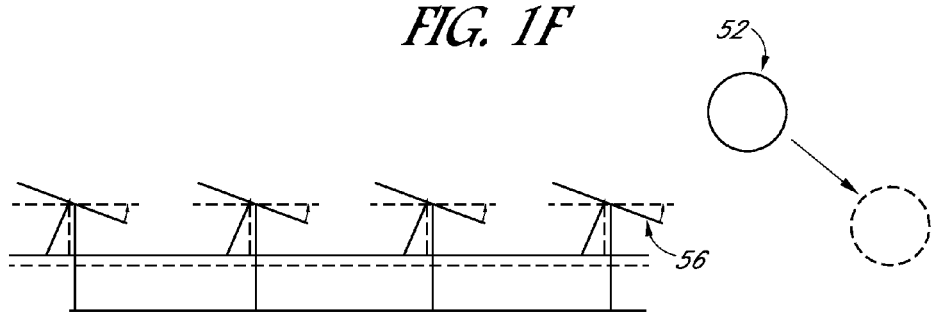
FIG. 1G is a schematic elevational view of the system of FIG. 1F, illustrating a back tracking movement during a portion of the evening.
Figure 1H:
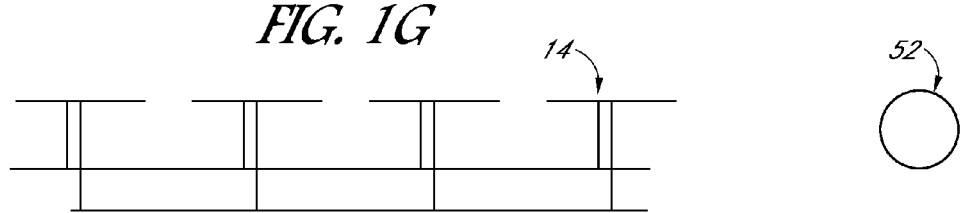
FIG. 1H is a schematic elevational view of the system of FIG. 1G, at sunset.

With reference to FIG. 1G, as the sun 52 continues to move across the sky, it eventually reaches a position, illustrated in FIG. 1G, at which the westward modules, for example, module 56, begins or will begin to cast shadows on the adjacent modules 12 positioned to the east. Thus, the controller 50 controls the modules 12 to tilt through a backtracking movement, like that described above with reference to FIG. 1E. By the time of sunset, as illustrated in FIG. 1H The various connector configurations used for connecting the various rows of modules 12 of the system 10 to the drive 30 can generate mechanical "slop," history [13:24], as well as dimensional variations caused by thermal expansion. As such, the different rows of devices 14 can be oriented at different angles relative to horizontal at any time. A detailed explanation of these effects is set forth in U.S. patent application Ser. No. 14/317,548 filed Jun. 27, 2014, the entire of contents of which is hereby expressly incorporated by reference. More specifically, the '548 application includes four equations referencing dimensions identified in FIGS. 13 and 14 of the '548 application, which can be used to calculate the angular position of modules 12 within any row of the system 10, or similar systems. Other techniques can also be used. Additionally, the calculations of the angular orientation of the modules 12 in any particular row of the system 10 also depends on which row is used as a reference row, for example, including an inclination sensor. Thus, the equations and inclination calculation techniques disclosed in the Ser. No. 14/317,548 application are merely examples of techniques that can be used. Other techniques can also be used. Set forth below are the four equations included in the Ser. No. 14/317,548 application which referenced FIGS. 1I-1K.

The connection 72 includes some mechanical "slop," as do many types of mechanical pivoting connections. When in the orientation of FIG. 1J, in which the drive 30 is positioned on an easterly side of the system 10, tension is generated along the link member 32, thereby causing the holes 74, 76 to squeeze the pin 80 in a manner in which all of the mechanical slop of the connection 72 is absorbed so as to effectively lengthen the drive strut 32. Additionally, the slop at each connection is cumulative on the overall effective length of the drive strut 32, thereby causing increasing angular deviations of each of the modules 12 along the westerly direction. With regard to the effective length of the drive links connecting the rows of modules with the drive 30, a first drive link can be the drive link 64 connecting the drive 30 with the first row (left-most row in FIG. 1J) and a second drive link connecting the drive 30 with the westward adjacent row of modules 12 can include the drive links 64 and 66. Thus the first and second drive links have different overall effective lengths and different numbers of connections 72 which contribute to angular offsets.

FIG. 1K illustrates the system 10 with the modules 12 oriented in an afternoon position, which generates torques 84 in a manner similar to that described above with reference to the torques 60. Because the drive 30 is oriented on the east side of the system 10, the torques 84 generate compressive forces 86 on the link members 64, 66, 68. These compressive forces 86 cause the holes 74, 76 to move toward each other, thereby absorbing the mechanical slop of the joint 72 in a manner which decreases the overall effective length of the drive strut 32. Additionally, the torques 84 can cause the torque arm 34 to apply a partially vertically upward force, thereby generating some displacement of the hole 78 upwardly.

FIG. 1I illustrates parameters that can be used for calculating an angular offset $\theta'$ (an angular orientation of a module caused by a change in the effective length of one of the link members 64, 66, 68), based on the magnitude of mechanical slop $\Delta DS$ of the horizontal position of the lower end of the torque arm 34, resulting from mechanical slop noted above. The magnitude of $\Delta DS$ can be measured and stored in the controller 50, described below.

For example, with reference to FIG. 1I, $\Delta DS$ is related to an angular offset $\theta'$ of one module as follows:

$$\Delta DS = X' - X = L_{ta} \sin \theta' - L_{ta} \sin \theta \qquad \text{Equation 1:}$$

where $\Delta DS$ is a measured magnitude of the horizontal offset of the end of the torque arm 34 due to mechanical slop in one connection 72, X is the expected horizontal component of the position of the lower end of the torque arm 34 relative to the axis or rotation of the torque tube 44, X' is the offset position of the horizontal component of the lower end of the torque arm 34 due to mechanical slop, and Lta is the length of the torque arm 34.

With continued reference to FIG. 1I, a cumulative $\Delta DS$ produced at a chosen row that is the nth row from a reference row (e.g., a row with a detected orientation), is related to the $\theta'$ of the chosen row as follows:

$$\Delta DS_n = n \cdot (X' - X) = n \cdot (L_{ta} \sin \theta' - L_{ta} \sin \theta) \qquad \text{Equation 2:}$$

Thus, an angular offset $\theta'$ of a row, can be calculated as follows:

$$\theta' = \sin^{-1}\left[\frac{\Delta DS}{L_{ta}} + \sin\theta\right] \qquad \text{Equation 3}$$

FIG. 1J illustrates the resulting deformations and angular offsets produced by thermal expansion of the drive strut 32. Additionally, FIG. 1J illustrates the drive 30 positioned on a westward side of the system 10, for purposes of illustrating the additive effect of thermal expansion with the mechanical slop described above.

With continued reference to FIGS. 1J and 1K, the thermal expansion of the drive strut 32 can be calculated using well-known formulas for thermal expansion, which provide precise mathematical measurements of changes in length of materials resulting from temperature changes, for example, from an initial temperature Ti to a subsequent temperature Th. FIG. 1J illustrates the solar collection modules 12 in an afternoon position so as to illustrate a typical scenario, when the ambient temperature rises from the morning initial temperature to a higher temperature in the afternoon, thereby generating a positive thermal expansion of the drive strut 32 and each of the associated link members 64, 66, 68.

The overall thermal expansion of the drive strut 32, or a portion thereof, corresponding to the accumulation of the expansions of each of the link members 64, 66, 68, can be calculated as follows:

$$\Delta TH = n \cdot [\alpha \cdot DS_0 (T_h - T_1)] \qquad \text{Equation 4:}$$

where n is the number of rows, α is the coefficient of thermal expansion of the material of which the link member 64, 66, 68 are made, DS0 is the length of a link members 64, 66, 68, Th is an ambient temperature at the time of the calculation temperature and Ti is an initial temperature, e.g., a temperature of the link members 64, 66, 68 when the DS0 dimension was determined.

With continued reference to FIG. 1J, with the drive 30 positioned on a westerly side of the system 10, and the modules 12 oriented in an afternoon orientation, the effects of positive thermal expansion and mechanical slop of the joints 72 combine in an additive manner, thereby generating a larger positive change in overall length of the drive strut 32. This is because with the drive 30 positioned on the westward side of the system 10, the gravity generated torques 80 generate tension forces in the drive strut 32, thereby combining the mechanical slop generated by the holes 74, 76 and increasing the overall length of the drive strut 32.

With reference to FIG. 1K, if the drive 30 is positioned on the easterly side of the system 10, the effects of positive thermal expansion and mechanical slop operate in opposite directions and thereby combine in a subtractive manner. The chart set forth below includes indications of when thermal expansion and mechanical slop are additive or subtractive, based on the position of the drive 30 on the east or west side of the system 10, and when the modules 12 are in before-noon or afternoon positions.

|  | Before Noon | Afternoon |
| --- | --- | --- |
| East Side Drive | Additive | Subtractive |
| West Side Drive | Subtractive | Additive |

The angular deviation caused by the sum of deviations of mechanical slop and thermal expansion can be calculated with the following formula:

$$\theta' = \sin^{-1}\left[\frac{\Delta DS + \Delta TH}{L_{ta}} + \sin\theta\right] \qquad \text{Equation 5}$$

Figure 1L:
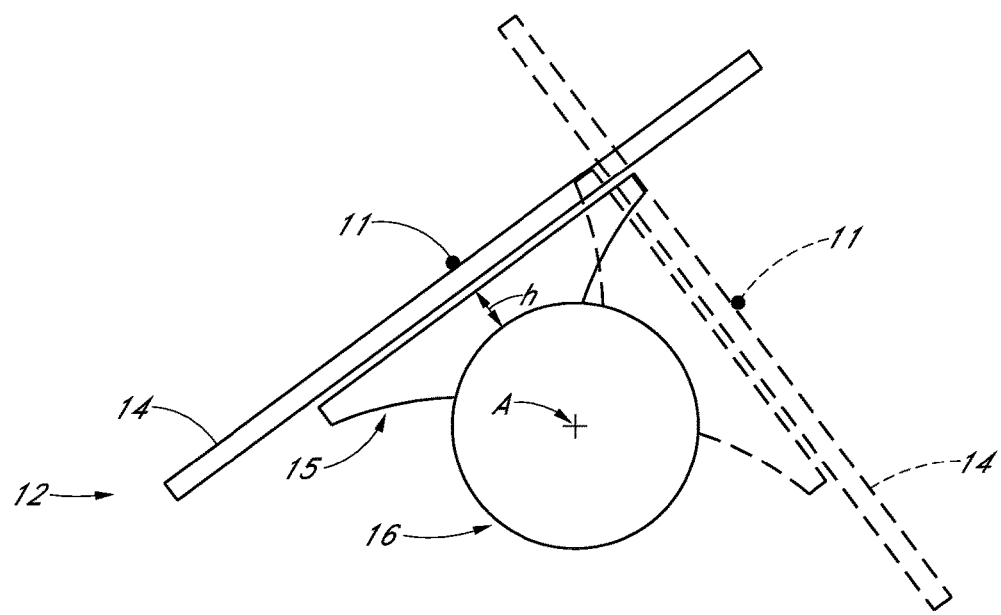
FIG. 1L is an enlarged schematic view of an end of one of the rows illustrated in FIG. 1C including an end view of a torque tube, a solar module support connecting a solar module to a torque tube, two positions being illustrated, one in solid line, and one in phantom line.
Figure 1M:
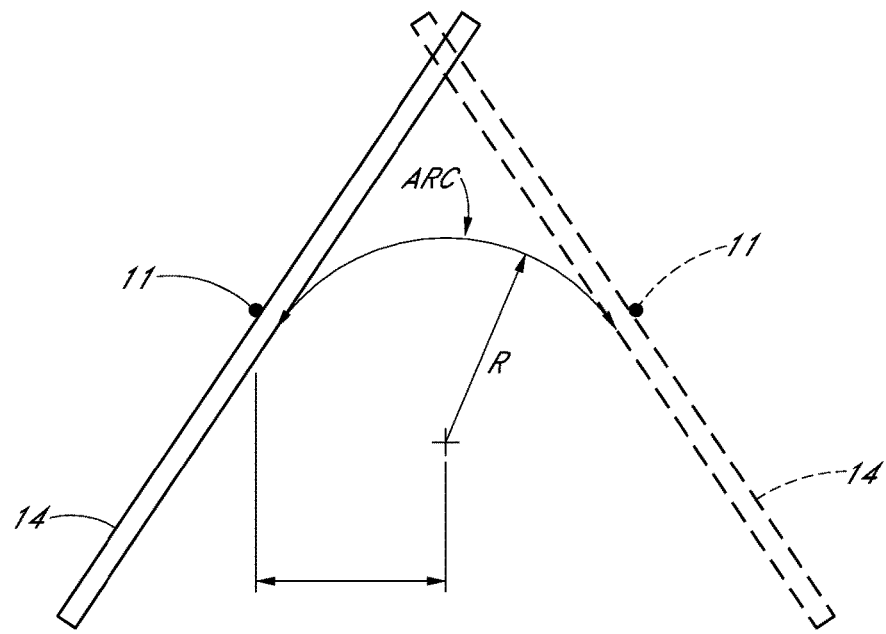
FIG. 1M is a further schematic view of the positions illustrated in FIG. 1I, illustrating the movement of the solar module through an arc.

With reference to FIGS. 1L and 1M, as the torque tube 15 pivots about its pivot axis A, the solar collecting device 14 moves through an arc or in other words, an arcuate motion, as more dramatically illustrated in FIG. 1M. As such, a midpoint 11 of an upper surface of the collecting device 14 moves along the arc defined by the radius R illustrated in FIG. 1M. The radius R is defined by the diameter of the torque tube 16, a height h of a support 15 supporting the collecting device 14 on the outer surface of the torque tube 16, and the thickness of the module 12. The nature of this movement can be considered and accommodated when aligning a cleaning device with the collecting device 14, described in greater detail below.

The equations set forth above with reference to FIG. 1I-1K, or other equations, can be utilized by the control unit 50 illustrated in FIG. 1N and/or during performance of the methods associated with the control routines described below, for example, for determining or estimating an angular inclination of a row od modules 12.

Figure 1N:
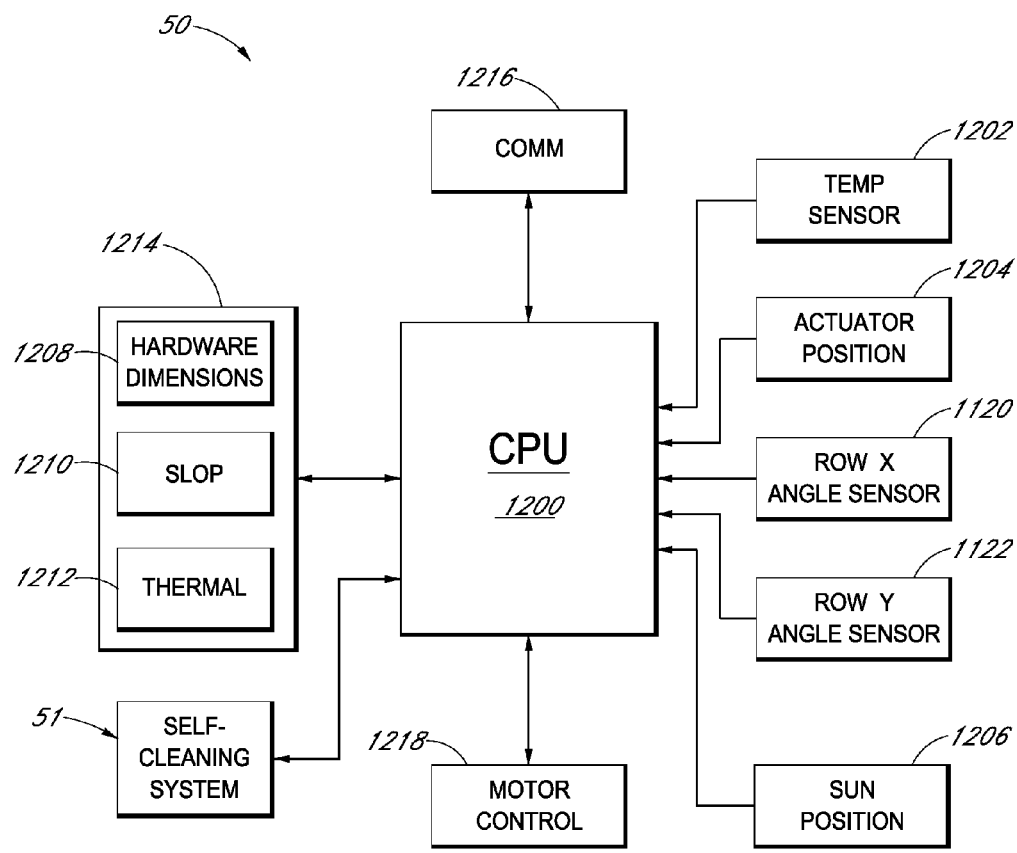
FIG. 1N is a schematic diagram of a control unit that can be combine and used to control the sun tracking movement of the system illustrated in FIGS. 1C-1M.

With reference to FIG. 1N, the control unit 50 can include a CPU 1200, which can be in the form of a programmable logic controller or purpose-built computer processor, designed to provide the functions described below with regard to controlling an orientation of the drive 30. Alternatively, the CPU 1200 can be in the form of a general-purpose processor, along with software providing an operating system for performing the functions noted above and described below. In other embodiments, the controller 50 can be in the form of a hardwired control system, in which the CPU 1200 is in the form of a logical circuit, configured to provide the functions noted above and described below, or any other type of controller.

The controller 50 can include one or more temperature sensors 1202. Such temperature sensors can be configured to detect a desired temperature, such as an ambient temperature, or surface or internal temperature of any desired component, or other temperatures. The temperature sensor 1202 can be configured to generate and output a signal indicative of the detected temperature. Such temperature sensors are well known in the art and commercially available.

The controller 50 can also include an actuator position sensor 1204. For example, the actuator position sensor 1204 can be mounted to detect a position or orientation of an output member of the drive 30. The actuator position sensor 1204 can be in the form of an angular orientation detector, linear orientation detector, or other type of sensors. The actuator position sensor 1204 can be configured to output a signal indicative of a position of an output member of the drive 30.

The controller 50 can also include the first angle sensor 1120 and 1122 described above.

The controller 50 can also include a sun position module 1206 configured to output an indication of the position of the sun 52. For example, the sun position module 1206 can be in the form of an optical detector designed to detect a position of the sun in the sky and to output a signal indicative thereof. Alternatively, the sun position module 1206 can be a look-up table including data indicating the position of the sun at any time or day during a solar year for the location of the system 10. Further alternatively, the sun position module 1206 can be configured to receive a signal from another device, for example, over a data network, which indicates a real time position of the sun 52 or correction data for any such data described above. As such, the sun position module 1206 can be configured to output a signal indicative of the position of the sun.

The controller 50 can also include one or more modules for providing fixed or dynamic data. For example, the controller 50 can include a dimensional module 208 configured for storing data corresponding to various dimensions of the system 10, such as, for example, the links of the drive strut 32 and its component link members 64, 66, 68, the width of solar modules 12, the spacing of solar modules 12, the ground coverage ratio (GCR) of the system 10, the number of rows in the system 10, the length of the torque arms 34, any dimensions required for execution of the formulas described above, or any other dimensions of any other component of the system 10.

The controller 50 can also include a mechanical slop reference module 210 which can include data indicating the magnitude of the mechanical slop associated with the connections 72, or other slop characteristics. Additionally, optionally, the mechanical slop module 210 can be configured to output values of mechanical slop which change over time, for example, increase in magnitude over time, so as to follow a likely increasing magnitude of the diameters of the holes 74, 76, 78 over time.

The controller 50 can also include a thermal reference module 1212 which can include data corresponding to the behavior of components of the system with regard to changes in temperature. For example, the thermal reference module 1212 can include coefficients of thermal expansion for various components of the system 10, for example, including the drive strut 32, the component drive link members 64, 66, 68, the torque arms 34, and other components.

The reference modules 1208, 1210, 1212 can all be connected to the CPU 1200 so that data from the module 1208, 1210, 2112 can be utilized by the CPU 1200 in performing calculations described above and below. In some embodiments, the reference modules 1208, 1210, 1212 are incorporated into a memory device 1214 which can be any type of memory device, including generic random access memory or other types of memory. Additionally, the modules 1208, 1210, 1212 can be accessible to allow users to change values stored in the modules 1208, 1210, 1212. For example, the modules 1208, 1210, 1212 or memory device 1214 can communicate with other devices, for example, through the CPU 2100 and a communication module 216. The communication module 1216 can be any type of network data communication device. The steps of a method, process, or algorithm described in connection with the embodiments disclosed herein, including the control routines described below can also be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art.

The controller 50 can also include a motor controller 1218 for controlling a motor which serves as an actuator included in the drive 30. Alternatively, the CPU 1200 can be configured to provide or output the control data for motor controller 1218 that is incorporated into an actuator of the drive 30. For example, in some embodiments, the CPU 1200 can be configured to calculate angle to be used by the motor controller 1218 as a target angle. The motor controller 1218 can be configured to use the target angle received from the CPU 1200 for feedback control of an actuator so as to, for example, move the drive strut 32 until a calculated or detected, selected feedback angle equals the target angle received from the CPU 1200. For example, in some embodiments, the CPU 1200 can issue a calculated target angle to the motor controller and also provide a feed of the output of any of the sensors 1204, 1120, 1122 or other position sensors as a selected feedback angle. Other feedback control techniques can also be used.

With continued reference to FIG. 1N, the control system 50 can also include a self-cleaning control system 51, described in greater detail below. The self-cleaning control system 51 can include various devices configured for automated cleaning of the system 10, and in particular, the upper surfaces of the solar energy collection devices 14. Typically, as described above, the solar energy collection devices 14 are formed with a plurality of solar cells imbedded in a laminate with the solar energy sensitive side facing upward or toward the sun during operation. Additionally, the devices 14 can be incorporated into solar modules 12 which can include a peripheral strengthening frame and optionally an additional protective layer such as glass above the light sensitive surface of the devices 14. The self-cleaning control system 51 can include devices for cleaning the upper surfaces of the devices 14 which may optionally include a sheet of glass. FIGS. 2-10, described below, illustrate a cleaning device, in the form of a robot 200, which can include optional combinations and variations of cleaning solutions, sprayers, brushes, and wipers. Additionally, FIG. 10 illustrates an optional configuration for a servicing station for refilling and/or recharging the cleaning device.

The cleaning device 200, also referred to as "robot 200" or "robotic cleaner 200" is described below and can serve as a cleaning device referenced throughout the disclosure herein.

Some details of a robotic cleaner 200 are described in commonly owned U.S. application Ser. No. 13/745,722, entitled "Mechanism for Cleaning Solar Collector Surfaces" by Grossman et al., filed on Jan. 18, 2013, U.S. patent application Ser. No. 14/339,370 entitled "Solar Module Cleaner" by Grossman, et al., filed Jul. 23, 2014, both of which are hereby incorporated by reference in their entirety. Furthermore, it is to be understood that the various embodiments shown in the figures are illustrative representations and are not necessarily drawn to scale.

This specification describes an example robotic cleaner 200, followed by detailed descriptions of various components of the robotic cleaner 200 followed by example methods of using the cleaner 200. Various examples are provided throughout.

Figure 2:
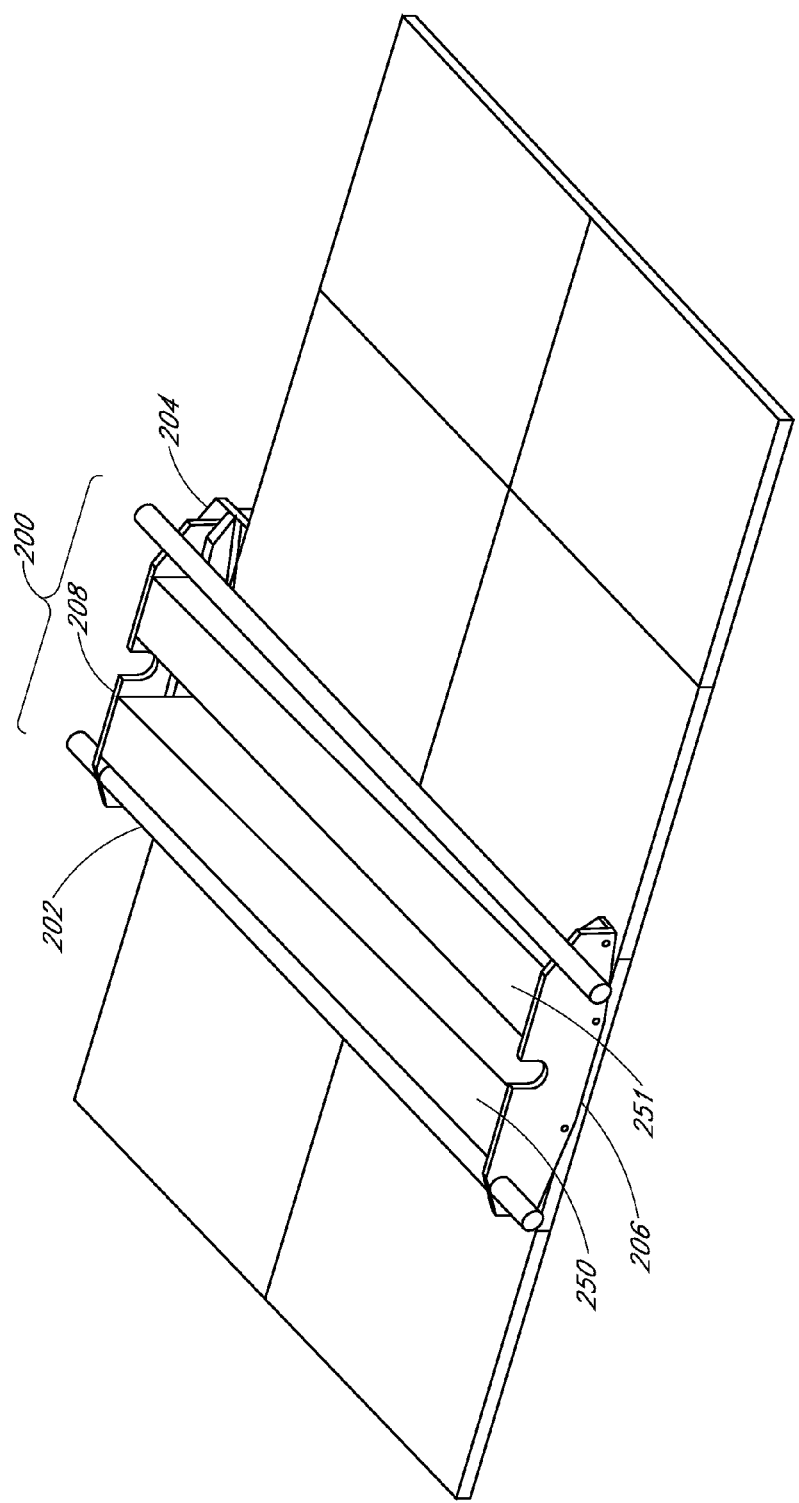
FIG. 2 illustrates an example robotic cleaning device, according to some embodiments, with an outer housing removed.

The robotic cleaning device 200 depicted in FIG. 2 is configured to clean a row of solar collectors, which can be in the form of modules 12, by traversing across the upper surface of the solar collectors of the array of solar collectors and by crossing gaps between adjacent solar collectors. Although illustrated as covering multiple solar collectors at a time, in some embodiments, the robotic cleaning device can be sized to accommodate a single solar collector at a given time.

The robotic cleaning device 200 can include one or more cleaning modules 250 and 251 for cleaning the collector surfaces of the array of solar collectors. As used herein, the term cleaning module is used interchangeably with the term cleaning head. The cleaning modules can include one or more components for removing accumulated particulate from the collector surface of a solar collector. Example cleaning modules 250 and 251, featuring a dual-squeegee configuration, are discussed in more detail below with respect to FIG. 4. However, in other embodiments, robotic cleaning device 200 may not include a dual-squeegee configuration, such as a zero, one, or more than two squeegee configuration.

Figure 3:
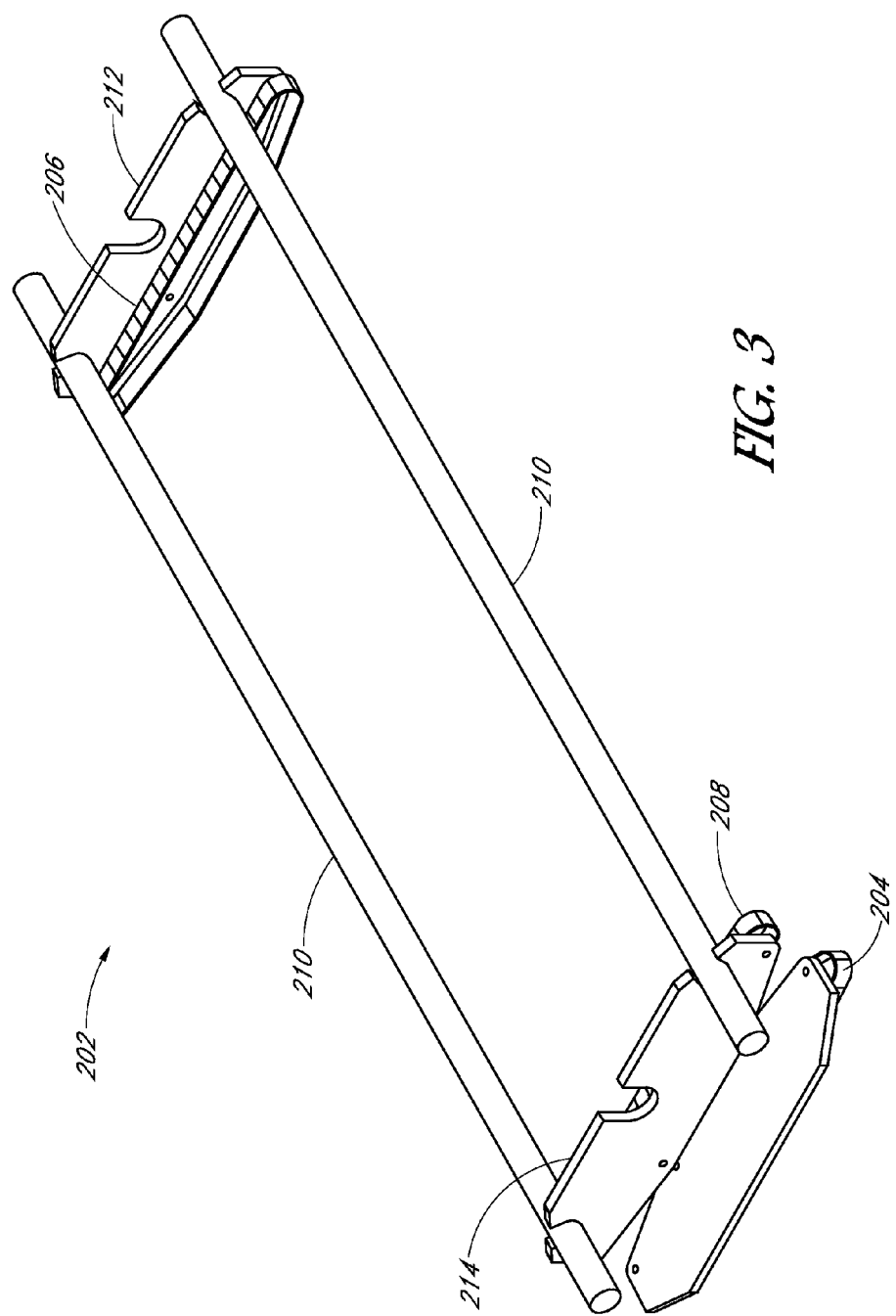
FIG. 3 illustrates an example frame of a robotic cleaning device, according to some embodiments.

As depicted in the examples of FIGS. 2 and 3, the robotic cleaning device 200 can include an upper guide mechanism 204 configured to traverse along an edge (e.g. upper edge when the solar collectors are in a tilted configuration) of the array of solar collectors. In general, the first guide mechanism 204 can inhibit the robotic cleaning device 200 from sliding off the inclined solar collector array (e.g., modules 12 tilted from horizontal for more optimal solar energy collection) and can assist in positioning the robotic cleaning device 200. In this example, the first guide mechanism 204 includes a continuous track belt having a flattened region for contacting the upper edge of an array of solar collectors. The leading and trailing ends of the track belt can be beveled at an angle to assist in transitioning the robotic cleaning device 200 across gaps between solar collectors. In some embodiments, the leading and/or trailing ends of the belt may not be beveled. In some embodiments, the guide mechanism 204 can include a row of rollers (e.g., polyurethane, etc.) having a diameter sufficiently large to roll across gaps between adjacent solar collectors.

In the illustrated embodiment, the upper guide mechanism 204 is mechanically coupled to the frame 202 that supports the components used to clean the collector surface of the solar collector. In this example, the frame 202 is joined to the upper guide mechanism 204 via a pivot joint that allows the frame 202 to rotate with respect to the upper edge of the solar collector. In other embodiments, the upper guide mechanism 204 is rigidly jointed to the frame 202. In some embodiments, the cleaning device 200 can include a lower guide mechanism (not shown) for guiding the cleaning device when used in other orientations.

In some embodiments, the robotic cleaning device 200 can be positioned along the array of solar collectors using two continuous track mechanisms. The frame 202 can include a front continuous track mechanism 206 disposed at the front, lower edge of the array of solar collectors and a rear continuous track mechanism 208 disposed at the rear, upper edge of the array of solar collectors. Each continuous track mechanism 204, 206, 208 can include an independently controllable drive motor configured to drive a continuous track belt in either direction. The robotic cleaning device 200 can be steered by, for example, driving the two continuous track mechanisms 206, 208 at different speeds with respect to each other. In some cases, drive for the upper guide mechanism 204 is electrically or mechanically coupled to the drive of either the front or rear continuous track mechanisms 206, 208. In some cases, the upper guide mechanism 204 does not include a drive and is a free-rolling mechanism.

As shown in FIG. 2, the continuous track mechanisms 206, 208 can each contact the collector surface via a continuous track belt having a flattened region. In some embodiments, the continuous track mechanisms 206, 208 can also have a beveled lead and trail portions to assist in traversing the gaps between adjacent solar collectors. In particular, the beveled lead and trail portions of the continuous track mechanisms 206, 208 can help convey the robotic cleaning device 200 over gaps between adjacent solar collectors that are at different heights.

The robotic cleaning device 200 can include sensors (e.g., two, four, six, etc.) configured to detect the gap between adjacent solar collectors. The sensors can be used to provide positional feedback for the robotic cleaning device 200. In one embodiment, the sensors are configured to detect gaps between adjacent solar collectors and can also detect the edge of a solar collector array. The sensors can also be used to prevent the robotic cleaning device 200 from driving past the end of the solar collector array and can also be used to reverse direction of movement, as described herein.

In one embodiment, the sensors are used to maintain the orientation of the robotic cleaning device 200 with respect to the array of solar collectors. For example, two optical sensors may be positioned toward the front and rear ends of the frame 202, respectively. Each optical sensor may produce a characteristic response signal when the sensor passes over a gap between adjacent solar collectors indicating a detection of the gap. The timing difference between the front and rear sensor response signals may indicate the orientation of the robotic cleaning device 200 with respect to the array of solar collectors. For example, the robotic cleaning device 200 may be oriented on the array of solar collectors with the lower, front end of the device leading the upper, rear end of the device. In this configuration, the front sensor will detect a gap between adjacent solar collectors before the rear sensor detects the same gap. The timing between the response signals of the two sensors indicates the relative angle of the robotic cleaning device 200 with respect to the array of solar collectors.

The sensors may also be used for purposes other than gap detection. In some implementations, the optical sensor may identify the location of the robotic cleaning device 200 along the array of solar collectors. For example, the optical sensors may detect a location marker or other optical fiducial marker that represents a known location along the array of solar collectors. The optical sensors may also be used to sense an identification mark on the collector surface indicating a serial number or other form of equipment identification. The sensors may also be used to estimate the quantity of particulate that has accumulated on the collector surface and help determine whether cleaning is necessary and how much cleaning should be performed.

Although much of the preceding description focused on optical sensors, other sensors can also be used including, without limitation, proximity sensors, capacitive sensors, inductive sensors, Hall Effect sensors, limit switches, mechanical sensors, and the like. In some embodiments, the sensors are configured to detect changes in material near the collector surface. For example, the sensor may be configured to detect changes from the glass surface of the collector surface to the metal frame around the collector panel perimeter.

FIG. 3 depicts the frame 202 of robotic cleaning device 200 without the cleaning modules. Note that the orientation of the frame 202 is rotated with respect to the view depicted in FIG. 2. As shown in FIG. 3, the frame includes an upper guide mechanism 204 disposed near the rear portion of the frame 202 for traversing the upper edge of a solar collector array. The frame also includes front and rear continuous track mechanisms 206, 208 disposed near the front and rear ends of the frame 702, respectively.

As shown in FIG. 3, the front and rear continuous track mechanisms 206, 208 are attached to end plates 212, 214. The end plates 212, 214 are structurally joined by two lateral beams 210. The end plates 212, 214 may be attached to the lateral beams 210 by a clamping mechanical interface that allows the plates to be unclamped and moved along the length of the lateral beams 210 to change the distance between the upper and lower continuous track mechanisms 206, 208. In this way, the robotic cleaning device 200 may be configured to fit a variety of differently sized solar collectors.

In some embodiments, the frame 202 may include one or more integrated, onboard liquid reservoirs for storing cleaning liquid (e.g., water) or other liquids used for cleaning the collector surface. For example, one or both lateral beams 210 may be formed from a hollow tube structure that is sealed at both ends to provide a sealed internal cavity. The internal cavity may be used to store the cleaning liquid used in the cleaning operations. In some embodiments, the end plates are also formed from a hollow structure (e.g., a box structure) that is sealed and can also be used as a liquid reservoir.

Figure 4:
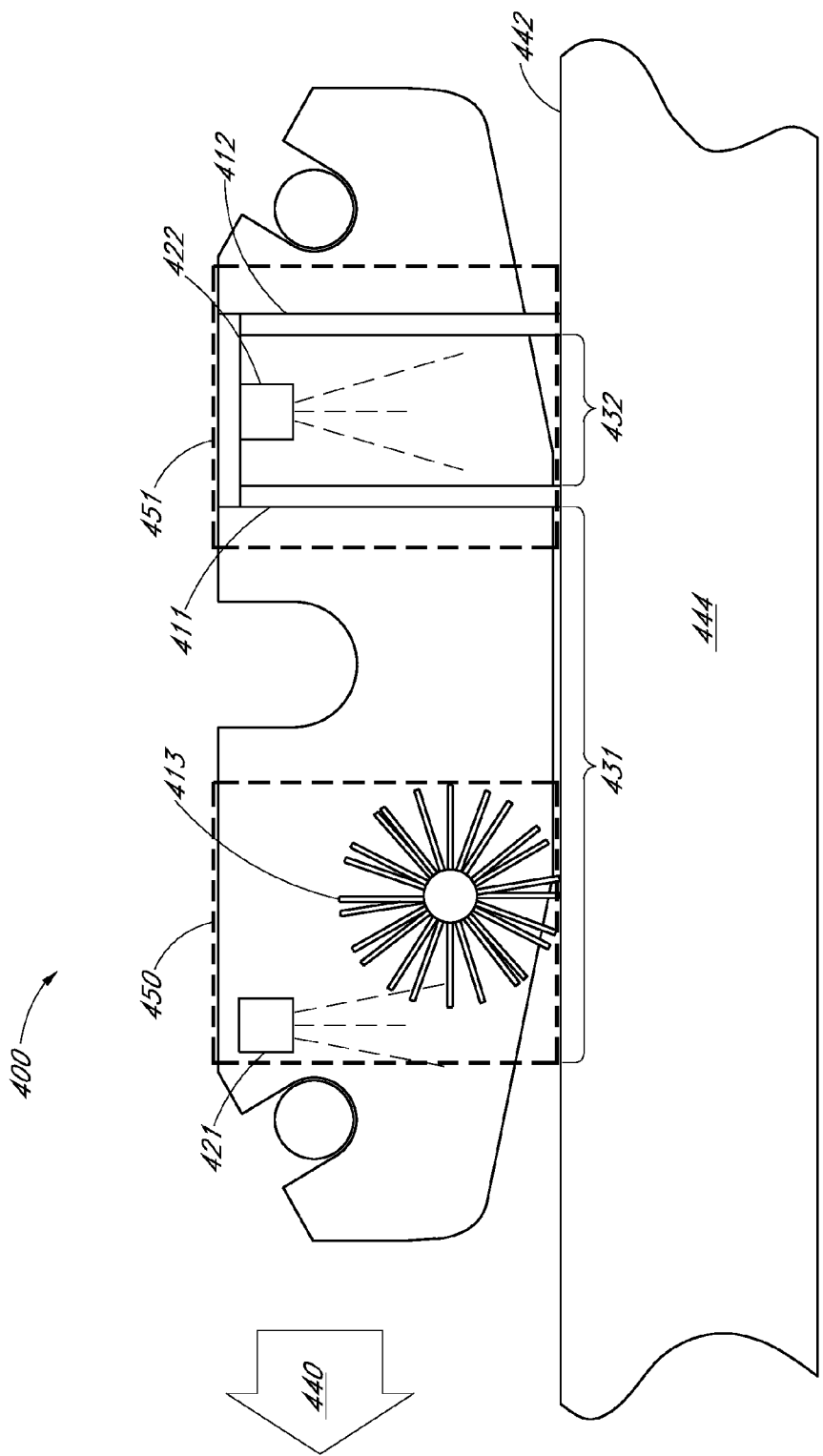
FIG. 4 is a schematic diagram of example cleaning modules for a robotic cleaner, according to one embodiment.

As previously mentioned, a robotic cleaning device can include one or more cleaning modules for cleaning the collector surfaces of the array of solar collectors. FIG. 4 depicts a schematic diagram of example cleaning modules 450 and 451 that can be integrated into the frame of the robotic cleaning device 200.

As shown in FIG. 4, cleaning module 450 includes a brush element 413 and a first liquid-dispensing unit 421. The brush element 413 has a longitudinal side oriented along a first direction substantially perpendicular to the drive direction 440. Cleaning module 451 includes a first squeegee element 411 and a second squeegee element 412 separated by a gap. A second liquid-dispensing unit 422 is disposed in the gap between the first squeegee element 411 and the second squeegee element 412. A cleaning liquid can be applied to the collector surface 442 of the solar collector 444 using the first and/or second liquid-dispensing unit 421, 422.

In this example, as the robotic cleaning device 200 is moved across the collector surface 442 in a drive direction 440, two cleaning areas are created: a low-dilution area 431 and a high-dilution area 432. As shown in FIG. 4, the low-dilution area 431 precedes the high-dilution area 432 as the robotic cleaning device 200 is moved in the drive direction 440. As the robotic cleaning device 200 is driven, the first squeegee element 411 acts as a liquid barrier and separates the low-dilution area 431 from the high-dilution area 432.

As shown in FIG. 4, the low-dilution area 431 corresponds to a portion of the collector surface 442 near the first liquid-dispensing unit 421, a portion of the collector surface 442 under the brush element 413, and extends toward the first squeegee element 411. In some embodiments, the first liquid-dispensing unit 421 delivers a first spray to a dry area of the collector surface 442. After being wetted by the first liquid-dispensing unit 421, the brush element 413 is used to dislodge particulate material that has accumulated on the collector surface 442 of the solar collector 444. As a result, the liquid present in the low-dilution area 431 typically contains a relatively high concentration of particulate material suspended in a volume of cleaning liquid. As the robotic cleaning device 200 is driven across the collector surface 442, a large portion of the cleaning liquid and suspended particulate material are removed by the first squeegee 411.

As shown in FIG. 4, the high-dilution area 432 is located on a side of the first squeegee element 411 opposite to the low-dilution area 431 and includes the area between the first squeegee element 411 and the second squeegee element 412. In a typical implementation, the high-dilution area 432 corresponds to the portion of the collector surface 442 that is being wetted by the cleaning liquid a second time. Accordingly, the cleaning liquid present in the high-dilution area 432 typically contains a lower concentration of particulate suspended in a volume of cleaning liquid as compared to the concentration of suspended particulate in the low-dilution area 431. As the robotic cleaning device 200 is driven across the collector surface 442, nearly all of the liquid and suspended particulate material is removed by the second squeegee element 412. If the solar collector 444 is installed on an incline, the liquid and suspended particulate material removed by the second squeegee element 412 may drain from the high-dilution area 432 by gravity. In some embodiments, the removed liquid may be collected and rerouted back to the first liquid-dispensing units.

As shown in FIG. 4, the brush element 413 may be a rotating brush having bristles extending radially from a central shaft or rod. In some embodiments, the bristles of the rotating brush may be arranged in a helical pattern down the length of the central shaft or rod. The helical arrangement of the bristles may generally push the cleaning liquid on the collector surface 442 toward one end of the robotic cleaning device 200 using an auger motion. If the robotic cleaning device 200 is installed on an inclined solar collector, the helical arrangement of bristles may auger or push the cleaning liquid up the incline as the brush is rotated. This configuration helps prevent the cleaning liquid from draining off the collector surface too quickly and may allow the robotic cleaning device 400 to clean the collector surface using a lower quantity of cleaning liquid.

FIG. 4 depicts one exemplary arrangement of cleaning modules 450 and 451. However, in some embodiments the cleaning modules are integrated into a single cleaning module/head, such as in the example of FIG. 5. Additionally, the cleaning modules may be configured to be manually or automatically lifted from the collector surface 442 to allow the robotic cleaning device 200 to traverse over gaps between adjacent solar collectors, such as PV trackers 1802 and 1804 of FIG. 18, or other obstructions.

As another example, in some embodiments, the robotic cleaning device can be configured to move in a first, reverse direction across a row of PV panels (and optionally apply a pre-soak liquid) with the cleaning module in an up, disengaged position. The robotic cleaning device can be configured to change directions at the end of the row to a second, forward direction. Such a traversal of a row and changing of directions so as to return to the beginning of the row can be referred to as a "row cleaning cycle". In some embodiments, when traversing a row of modules in the forward direction, the robotic cleaning device 200 can be configured to apply the cleaning module in an engaged position. Note that, in one embodiment, even when the cleaning module is disengaged, at least a portion of the cleaning head (e.g., brush 513) may still contact the PV panel(s) to provide a coarse cleaning.

The robotic cleaning device 200 may also be configured for bi-directional operation. For example, a dual-squeegee cleaning module similar to module 451 may be arranged on either side of a brush cleaning module similar to module 450. One of the dual-squeegee cleaning modules may be manually or automatically lifted from the collector surface 442, depending on the direction of travel.

In various embodiments, squeegees can be sensitive to the angle of incidence with the glass. For example, in some embodiments, squeegees can operate between approximately 20° and 35° off perpendicular. Using a bell-crank actuator to actuate the cleaning head can make achieving such an angle difficult because bell-crank actuators can allow for both translation and rotation. In some instances, if the robot pitches forward or backward (e.g., when climbing from one panel to the next if there is a height difference), a bell-crank actuator based cleaning robot may not work because even if it lowers the cleaning head to make contact with the module (e.g., as in a step down situation), it has rotated the squeegee out of its normal orientation.

Figure 5:
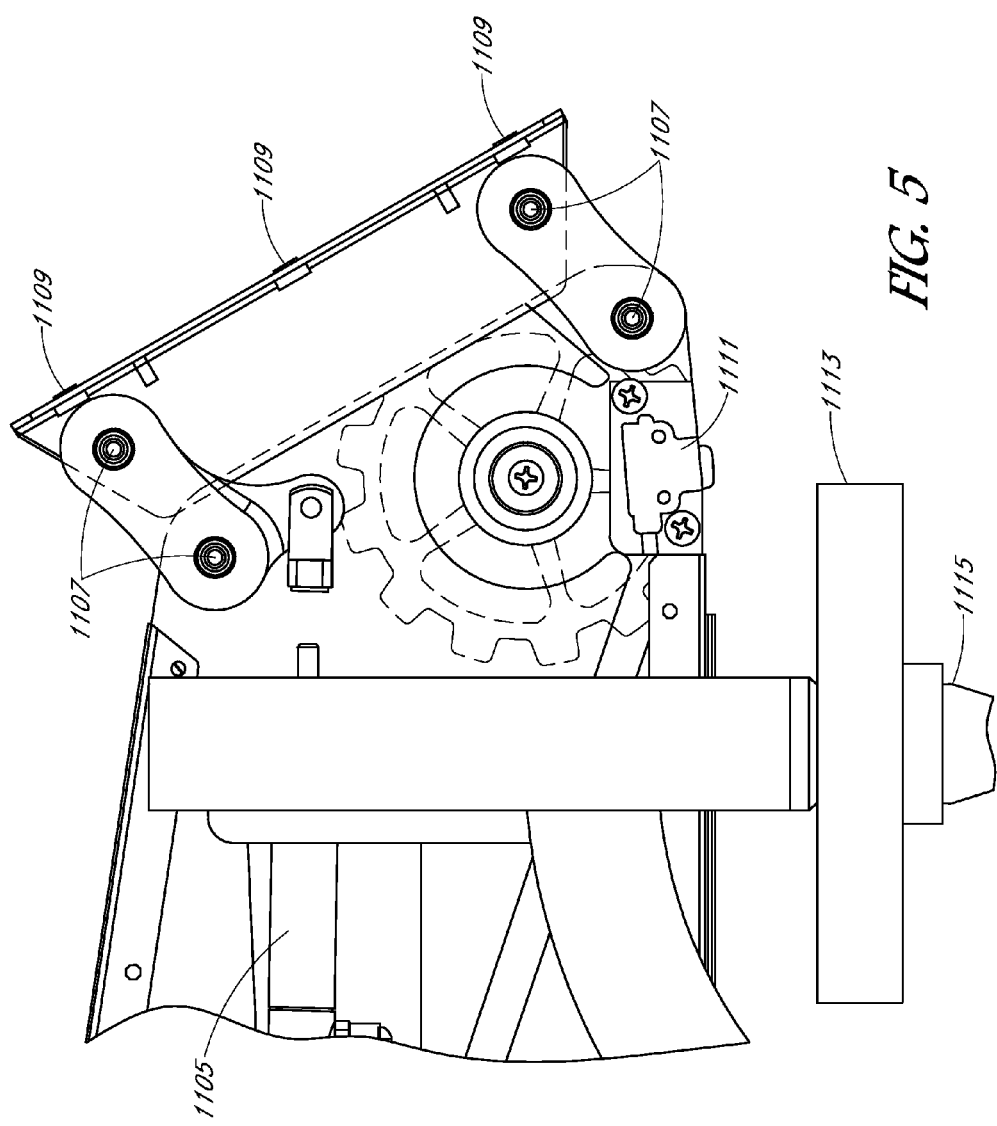
FIGS. 5-6 illustrate cleaning head actuation with translation but without rotation, according to some embodiments.
Figure 6:
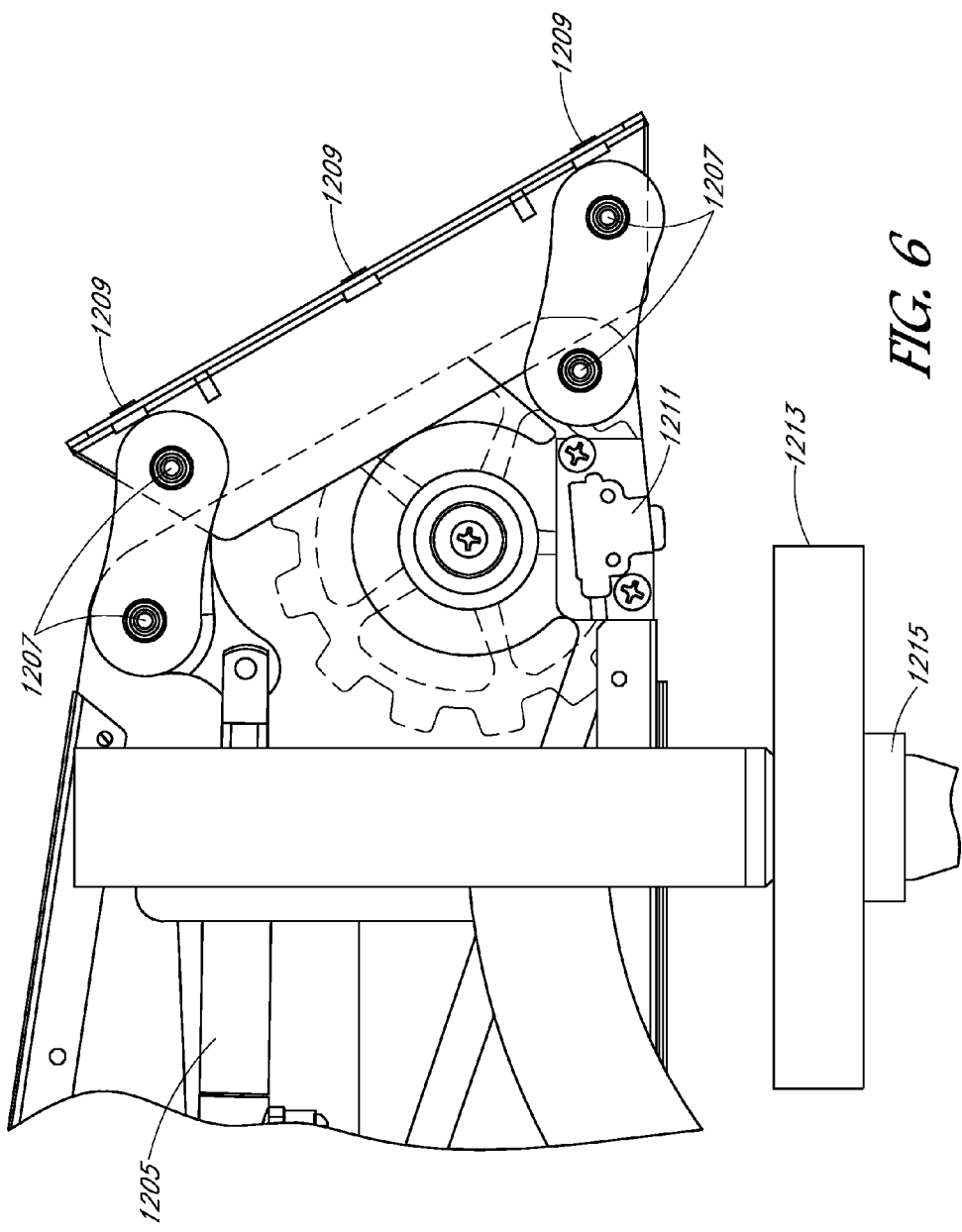

To achieve cleaning head actuation with translation but not rotation, in some embodiments, a parallel linkage mechanism can be used as illustrated at FIGS. 5 and 6. As shown, FIG. 5 illustrates the brush mount bracket of the robotic cleaning device in its up (disengaged) position and FIG. 6 illustrates it in its down (engaged) position. In one embodiment, a pneumatic cylinder 1105/1205 is configured to actuate the cleaning head. As shown between FIGS. 5 and 6, the angle the bracket makes relative to the side of the figure is consistent between the positions shown in FIGS. 5 and 6.

Pivot bolts 1107/1207 can be used as pivot points for the parallel linkage mechanism and mounting locations 1109/1209 are the points at which the cleaning head is coupled to the actuator. Sensor 1111/1211 can be a proximity sensor (e.g., acoustic sensor, photoelectric sensor, etc.) configured to determine whether a PV module is directly beneath the sensor. Wheel 1113/1213 can be used as a guide to help guide the robotic cleaner over the module. Stacking pin 1115/1215 can be used to stack multiple cleaners together.

Figure 7:
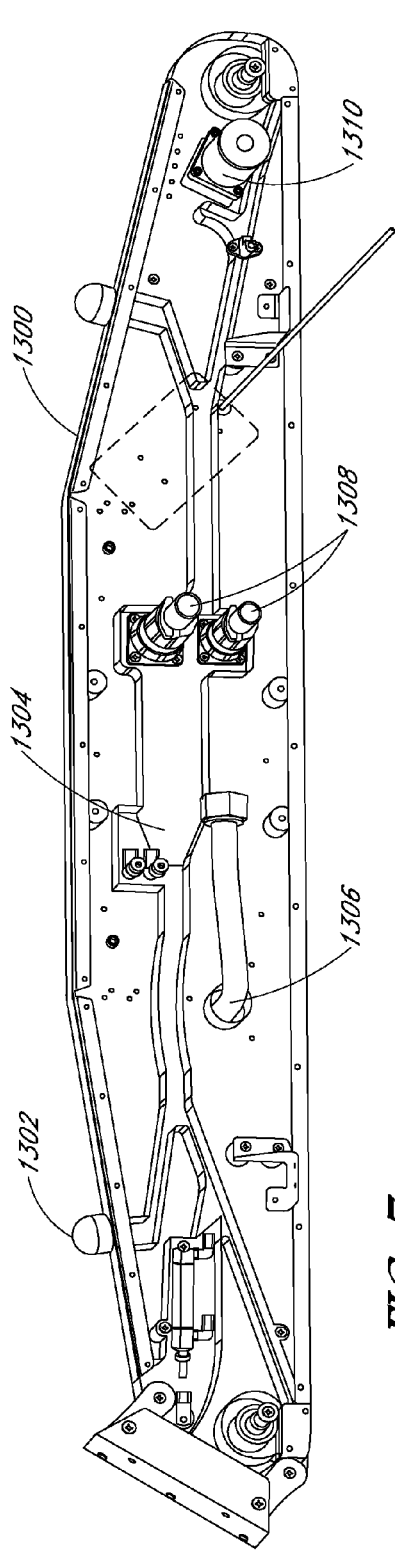
FIGS. 7-9 illustrate example end plates for drive modules of a robotic cleaner, according to some embodiments.
Figure 8:
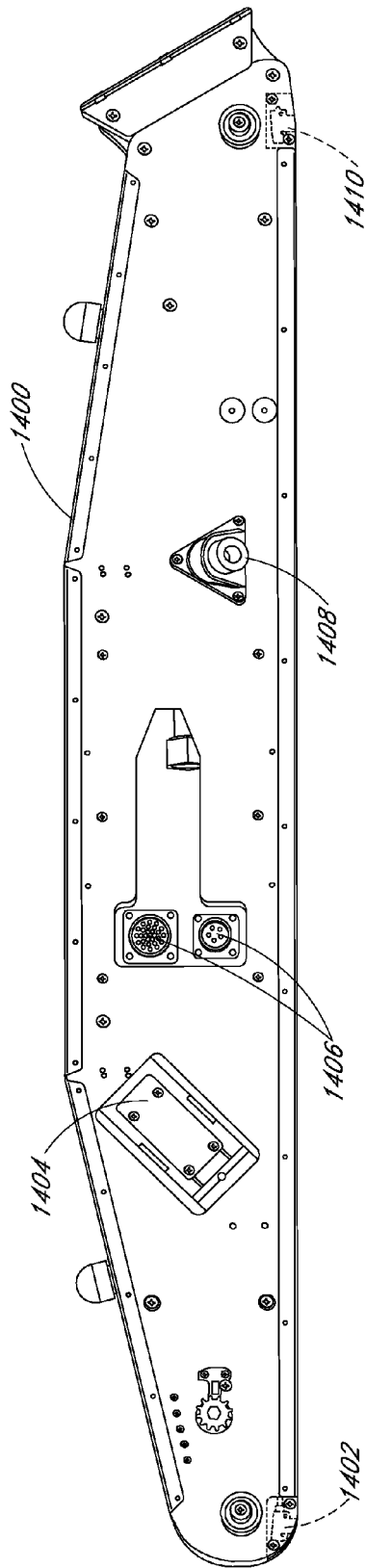
Figure 9:
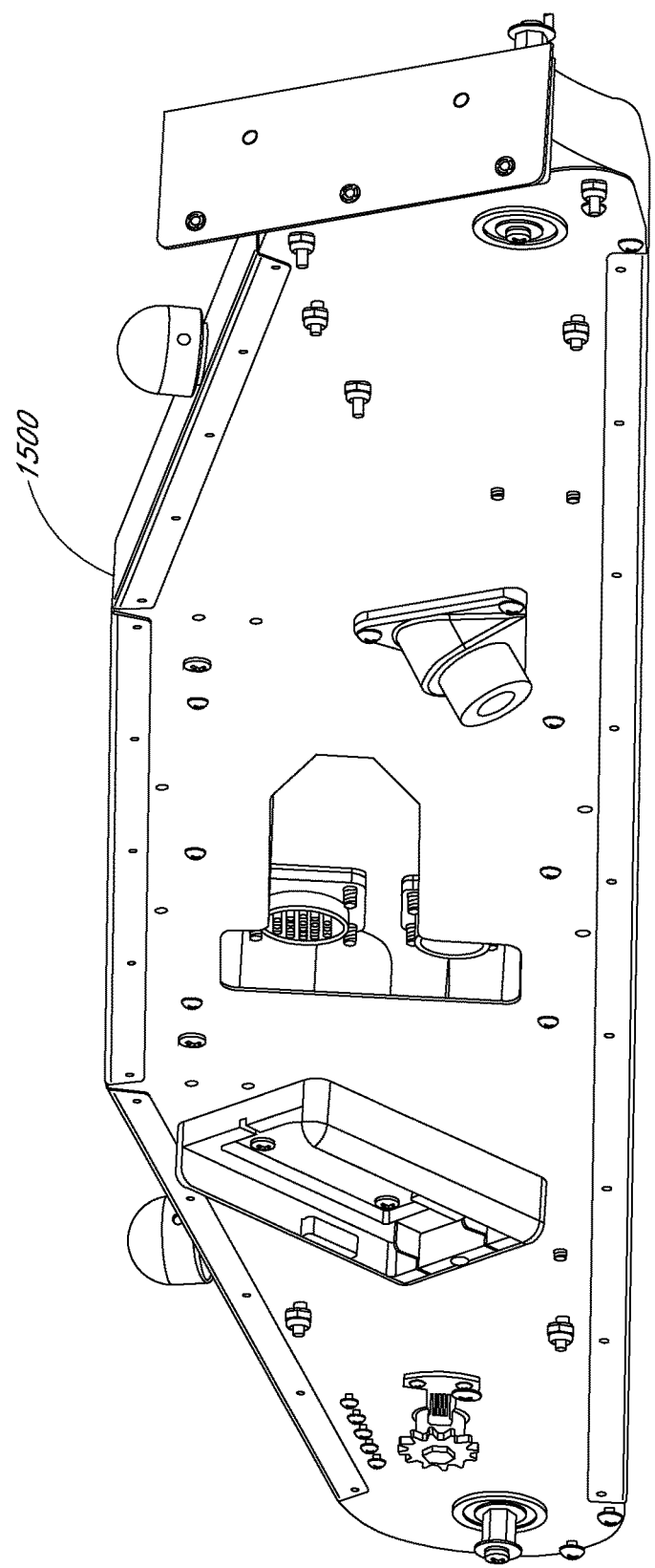
Figure 10:
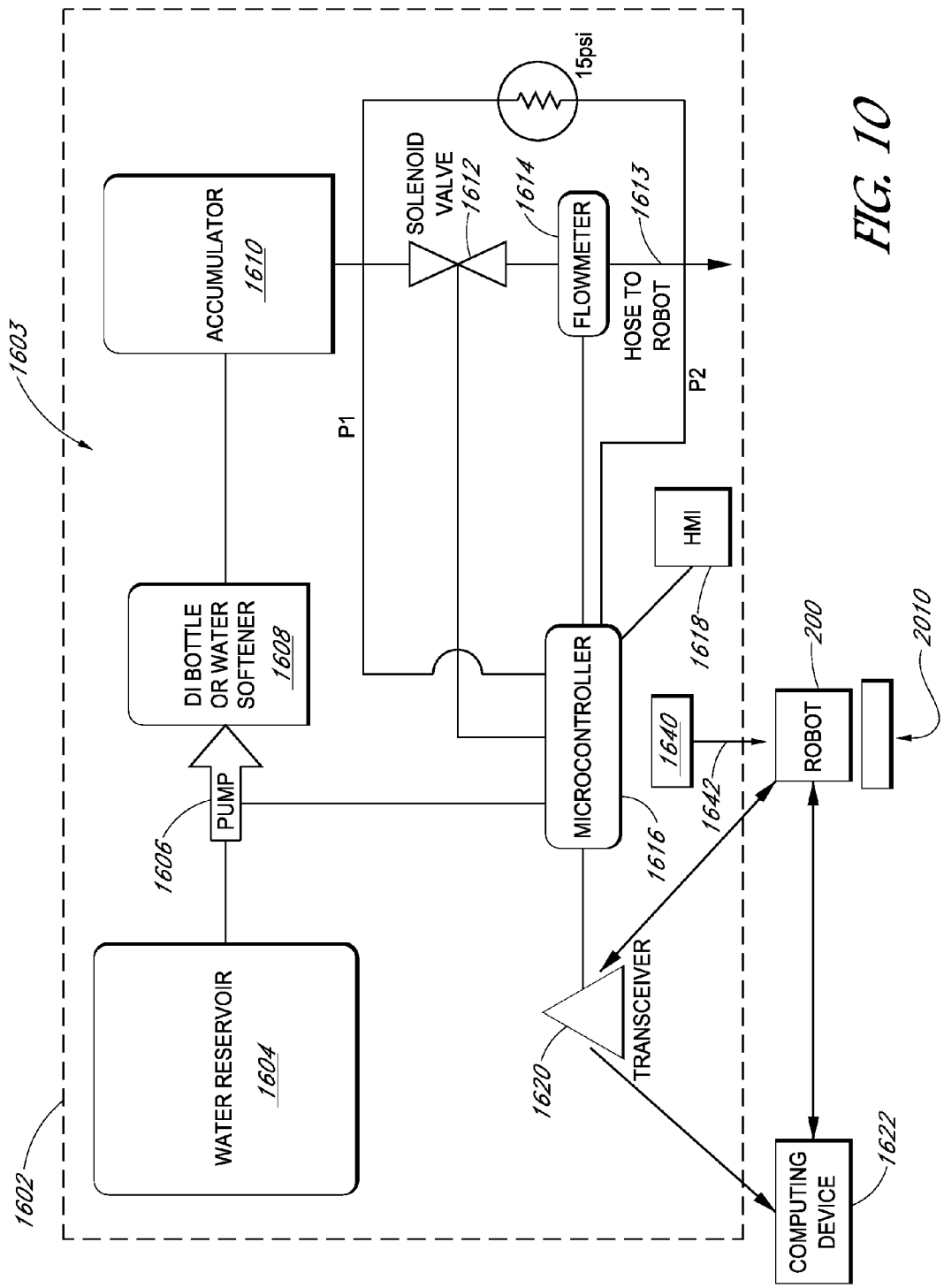
FIG. 10 illustrates an optional servicing module which can be used in conjunction with a self-cleaning system, according to some embodiments.
Figure 11:
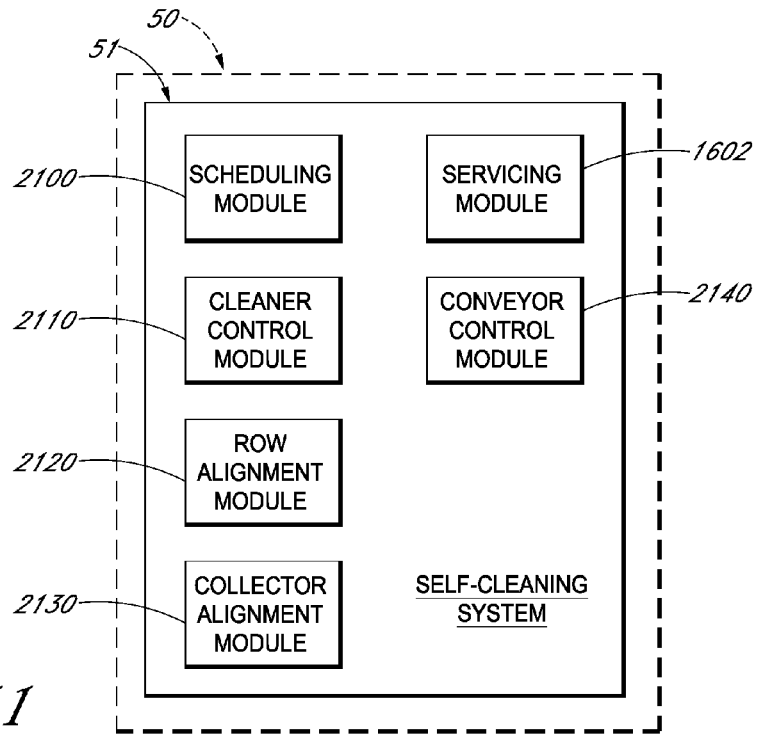

FIGS. 7-9 illustrate example drive modules 1300, 1400, and 1500, according to various embodiments of the cleaner. In some embodiments, a lightweight metal, such as aluminum, foam (e.g., urethane tooling foam), and an injected urethane resign bonded with contact cement can be used to form the end plates. In various embodiments, the foam is routed out in various paths to accommodate routing of wire and hoses (e.g., pneumatic hoses), actuated component(s), sensor(s), and motor(s). FIG. 7 illustrates a transparent view of the aluminum and foam structure of the interior left drive module (right hand side is a mirror of this assembly), showing the anthill like paths with features removed for routing of wire, hose, and internal components. Status light 1302 can be used to provide an indicator of the cleaner's operational status (e.g., low battery, fully operational, low water, out of water, malfunctioning GPS, etc.). As shown, path 1304 can be used to accommodate wiring, tubing, and/or other components. Hose 1306 illustrates a fill hose which comes from the other side of the drive module to a water/solution reservoir. In the illustrated embodiment, ports 1308 can be used to couple drive module electronics to a control board. As illustrated, drive module 1300 also includes at least one drive motor 1310.

FIG. 8 illustrates drive module 1400, which is drive module 1300 as seen from the other side. Sensors 1402 and 1410 can be configured to sense whether the sensors are directly above a portion of a PV module or not (e.g., gap), which can then be used to direct the robotic cleaning device to change directions or correct its course to maintain proper alignment. The end plate of the drive module can also include a battery connector 1404 configured to receive a detachable battery. Ports 1406 illustrate the opposite sides of ports 1308 and water fill port 1408 illustrates a portion of the end plate to which the reservoir can be coupled.

FIG. 9 illustrates end plate 1500 of the drive module with the aluminum layer visible (and hiding the components described at FIGS. 7 and 8).

FIG. 10 illustrates a servicing station 1602 which can be included in the self-cleaning system 51. The servicing station 1602 can provide a variety of servicing functions, such as providing filling including a metered fill, of the cleaning device 200, recharging, and other services.

In some embodiments, the robotic cleaning device 200 can be configured to monitor the current and/or voltage into a positive displacement pump of the robot. Based on the monitored current and/or voltage, the robot 200 can be configured to consistently distribute the appropriate amount of liquid/water (e.g., approximately less than or equal to 0.1 liters per square meter). For example, in one embodiment, the pump can be configured to pump as much water as it can when the robotic cleaning device is moving in the cleaning direction (forward). The robot 200 can slow down or speed up to keep the water per unit area approximately constant (e.g., within 10% of a target water per unit area). In some embodiments, in addition to or instead of slowing down or speeding up to match the pump configuration, the pump can be configured to increase or decrease the amount of liquid dispensed to match the speed of the robotic cleaning device 200.

In another embodiment, consistent distribution of a particular amount of liquid/water can be implemented in other ways. For example, the robotic cleaning device 200 can include a flowmeter configured to directly measure the flow. Based on that measurement, the robot 200 can speed up, slow down, increase the pump rate, decrease the pump rate, and/or modify its operation otherwise to achieve the particular amount of liquid/water per unit area.

In addition to dispensing a consistent and proper amount of cleaning liquid, the robot 200 can detect if and when the cleaning liquid is out based on the current and/or voltage measurement(s). If the robot 200 is out of cleaning liquid, it can light up or communicate to the servicing station 1602 that it is out of cleaning liquid. The system can flag that that particular row is not completely clean and/or the robotic cleaning device 200 can clean the same row again.

As an alternative to the pump pumping as much water as it can when moving forward, the robotic cleaning device can be configured to operate in a particular cleaning mode, such as light, medium, or heavy soiling modes. Accordingly, the robotic cleaning device 200 can be configured to select a particular cleaning mode based on its own determination of soiling level or it can be instructed to operate in a cleaning mode by the microcontroller 1616. As noted above, the pump dispense rate, speed of travel, or both can be configured to achieve a particular amount of liquid per unit area and/or a particular cleaning mode.

As described herein, soiling levels can be determined visually by an operator, by the cleaning robot's sensors, by measuring particulates in rinse water, by measuring leftover water in the onboard reservoir, among other examples.

In some embodiments, the robot 200 can be configured to determine an amount of remaining cleaning liquid, if any, that it has at the completion of cleaning a row of panels. Depending on how quickly the robot 200 runs out of water or how much water remains at the completion of cleaning a row of modules 12 (e.g., by the robot emptying its remaining water and detecting that amount), the robot 200 can communicate with the servicing station 1602 that it needs a particular amount more or less cleaning liquid. In one embodiment, the robot 200 can communicate wirelessly via a transceiver to the servicing station 1602.

In one embodiment, the servicing station 1602 can include a generator, battery charger(s) 1640, and a fill system 1603.

In some embodiments, the fill system 1603 can include reservoir 1604 that can store the water/cleaning liquid from which the robot's onboard reservoir 2240 (FIG. 14) is filled. The fill system 1603 can also include microcontroller 1616 and pump 1606, which can receive instructions from microcontroller 1616 to pump water to water softener 1608 or DI resin bottle. From there, the pumped cleaning liquid can be provided to accumulator 1610. Accumulator 1610 can store water at pressure (e.g., ~80 psi) in the system and can permit the use of a smaller pump 1606. In various embodiments, the pressure of the system at accumulator 1610 is approximately 60-80 psi. Microcontroller 1616 can also be coupled to solenoid valve 1612 to open or close the valve. When the hose 1613 is connected to the robotic cleaning device 200 to fill the robot's onboard reservoir 2240, the pressure at pressure sensor P2 can drop (e.g., to zero or near zero) and microcontroller 1616 can open solenoid valve 1612 and turn on pump 1606. When the robotic cleaning device's reservoir 2240 is nearly filled to the desired fill amount, solenoid valve 1612 can be closed and pump 1606 can be run until pressure in accumulator 1610 is built back up. In one embodiment, a regulator can be used to maintain 15 psi of pressure at the end of the hose 1613 when the solenoid valve 1612 is closed to allow for a dry disconnect. Moreover, the regulator can also re-pressurize the line to 15 psi so the microcontroller 1616 can detect the next connection of a robotic cleaning device 200.

The servicing station 1603 can also include a transceiver 1620 to communicate with computing device 1622 and robotic cleaning device 200. Various protocols can be used such as Bluetooth, Zigbee, or others. Computing device 1622 can communicate with and provide data to a remote server, which can maintain cleaning schedules, maps of PV installation sites, among other data.

In one embodiment, the support system is a modularized system that can be added to a vehicle driven to a solar site.

Consider the following example operation of the robotic cleaning device 200 and servicing station 1602. In one embodiment, before the robot 200 starts cleaning a particular row of PV modules, the servicing station 1602 can be configured to provide a metered fill of liquid to a the robotic cleaning device's onboard reservoir 2240 based on the soiling level of the PV modules 12. As discussed above, the soiling levels can be determined in a variety of manners. For example, soiling levels can be determined visually by an operator, by the cleaning robot's sensors, by measuring particulates in rinse water, by measuring leftover water in the onboard reservoir 2240, among other examples.

In one embodiment, the servicing station 1602 can receive an indication from the robotic cleaning device 200, of an amount of water remaining in a reservoir onboard the robotic cleaning device 200. For example, the robotic cleaning device 200 can measure the amount of liquid remaining and provide that measurement to the servicing station 1602. In another example, the robotic cleaning device 200 may not make such a measurement itself and can instead discard the remaining amount and the servicing station 1602 can measure the discarded amount. Based on the indication of cleaning liquid remaining, the servicing station 1602 can determine how much liquid to fill the robot's onboard reservoir 2240 with. For example, if a large amount of water remained, the servicing station 1602 can determine that less water than the previous fill should be provided to the robot 200. If no water remained, the support system can determine to provide a larger fill or same fill amount than the previous fill. The servicing station 1602 can then fill the robotic cleaning device's onboard reservoir 2240 with the determined fill amount. Note that because soiling amounts can vary, even within a single solar installation, the fill amount from cleaning pass to cleaning pass can vary. Thus, in a subsequent fill operation, the servicing station 1602 can determine that a different fill amount should be used for the subsequent refill.

As another simple example, an operator can simply decide that a particular row was not sufficiently cleaned and may configure the servicing station 1602 to provide a larger than normal fill amount.

In some embodiments, the robotic cleaning device 200 can receive a command, from the servicing station 1602 (e.g., the computing device 1622), to use more or less water per unit area (e.g., low, medium, heavy soiling modes, etc.). In other embodiments, the robotic cleaning device 200 can be configured to use all of its onboard water in a single cleaning pass (e.g., along a row of PV panels) and the amount of water used is based on the amount of water in the onboard reservoir 2240. Therefore, if the servicing station 1602, operator, or robotic cleaning device 200 indicates that more water is needed, then a larger fill amount will be used and a greater amount of water per square meter will be used.

Figure 11:
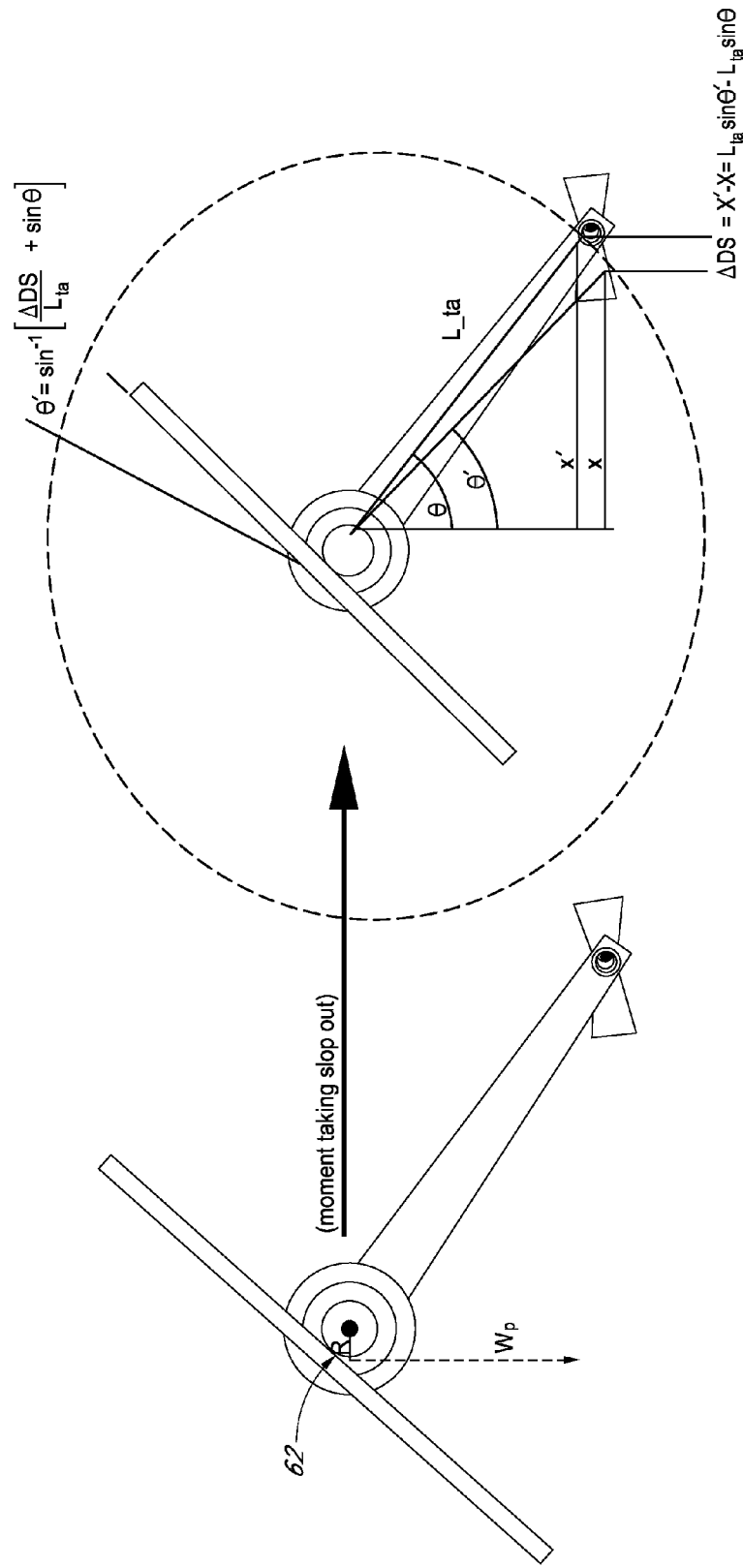
FIG. 11 is a schematic diagram of a self-cleaning control system in accordance with an embodiment.
Figure 12:
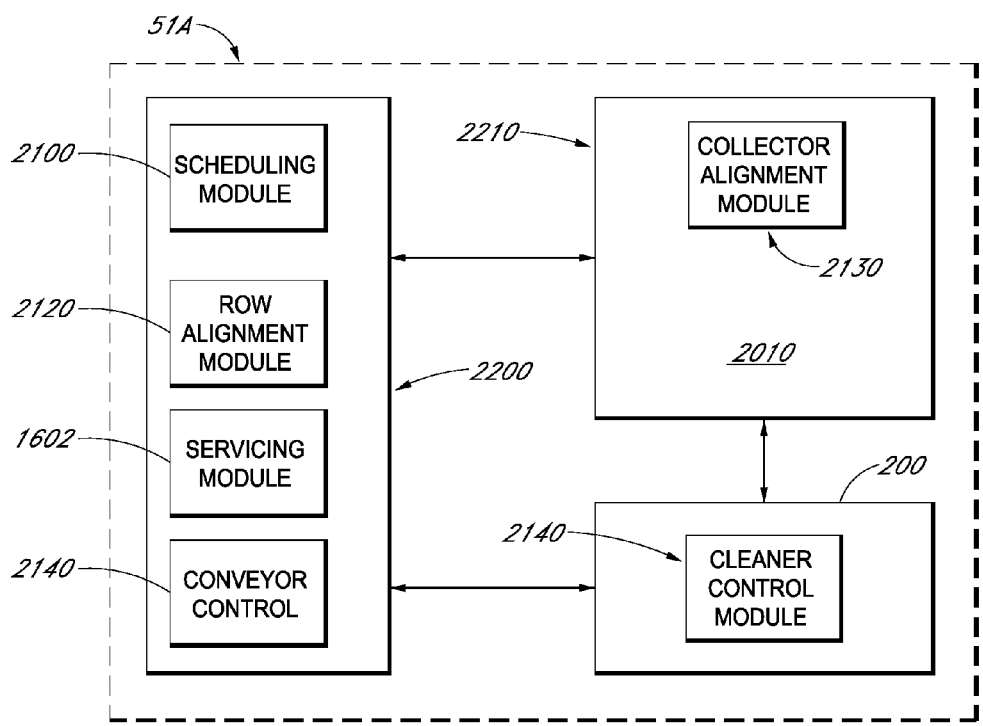
FIG. 12 is a schematic diagram of a further embodiment of a self-cleaning control system, in which certain components are divided between different locations in the solar energy collection system.
Figure 13:
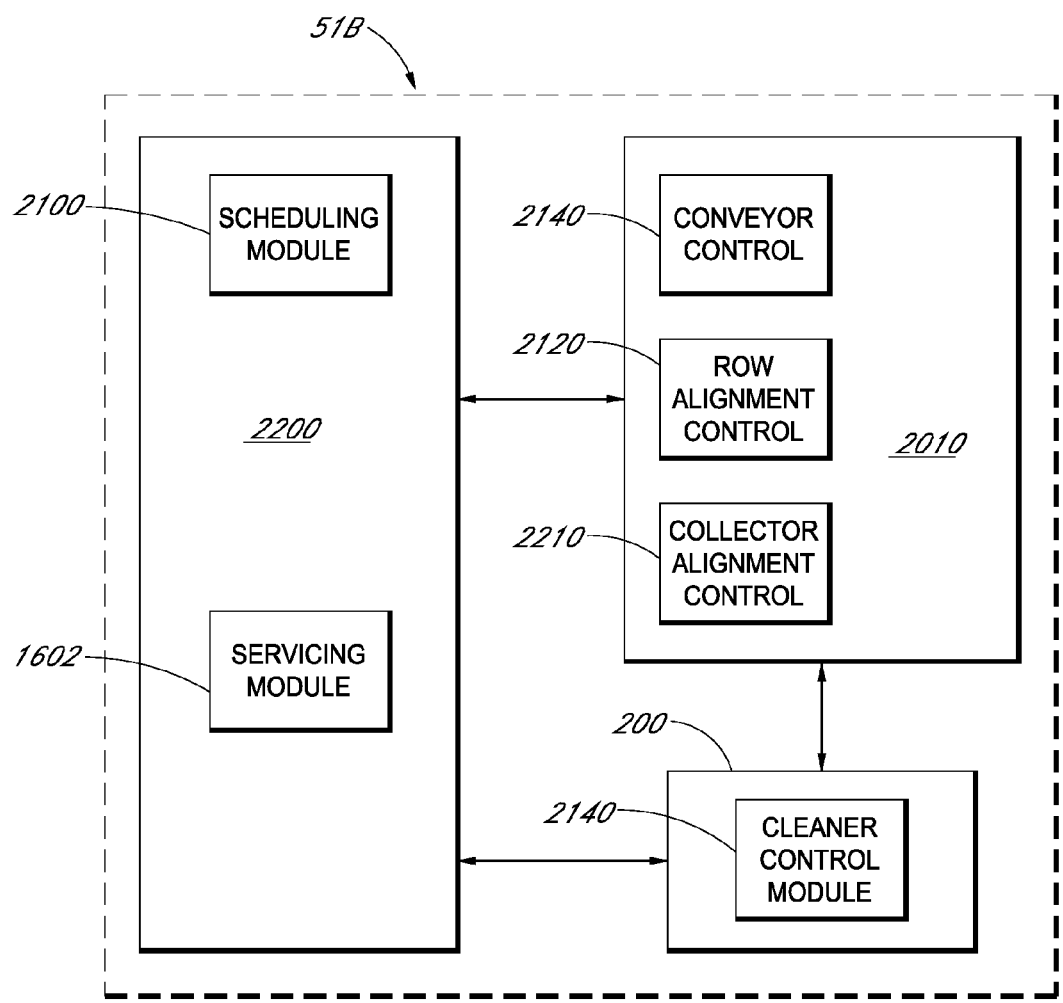
FIG. 13 is a schematic diagram of a further embodiment of a self-cleaning control system, in which certain components are divided between different locations in the solar energy collection system.

In various embodiments, the robotic cleaning device 200 can include a GPS receiver into its control board. The GPS can allow the robot 200 to monitor its position. In one embodiment, the GPS locations can be stored in non-volatile memory in the control board. When one or more robots 200 are within range of the computing device 1622, they can relay their logs (e.g., including an indication of which PV modules 12 have been cleaned) to the servicing station 1602 computing device. The GPS information can be analyzed to determine which modules at a site have been cleaned and when they have been cleaned. In some embodiments, the computing device 1622 can be included in the scheduling module 2100 (FIGS. 11-13).

As described above, in some embodiments, the robotic cleaning device 200 can be equipped with multiple (e.g., four) downward facing sensors for detecting PV panels below the robot 200. In some embodiments, four sensors are located in the four corners with two in each drive module. The sensors can provide a logic level voltage to the control board indicative of whether a module 12 is directly below the sensor. The control board can detect the logic level and changes in the logic level. Changes in the logic level can represent the sensor (e.g., photoeye) passing from the panel to the gap between the modules 12.

Moreover, the sensors can also be used to determine when the robotic cleaning device 200 should change directions. For example, in some embodiments, the robotic cleaning device moves backwards along the row of PV modules. Once the robotic cleaning device detects the end of the row (and not just a gap between PV modules), such as the end of the row of a tracker, the robotic cleaning device can change directions. Such a traversal of a row and return to the end of a row can be considered as a "cleaning cycle".

In some embodiments, onboard GPS measurements can be provided to the microcontroller 1616 and the microcontroller 1616 can instruct the robotic cleaning device 200 to change direction, for example, in embodiments in which the microcontroller 1616 has access to GPS coordinates of the PV modules 12 at the site. Or, in another embodiment, the robotic cleaning device 200 can directly use its GPS coordinates in conjunction with the sensor data to determine the end of the row.

One advantage of the metered fill technique and structure is that it accommodates a wide variety of soiling conditions and row length without wasting a large amount of water. Instead, the system can use a low amount of water, yet clean the PV modules better than other systems.

With continued reference to FIG. 10, the service station 1602 can also include a recharging module 1640. The recharging module 1640 can be configured to recharge an electrical storage device 2254 (FIG. 14) on the robot 200. Additionally, the recharging module 1640 can include a conduit 1642 for connecting the recharging module 1640 to the power storage device on the robot 200.

Figure 14:
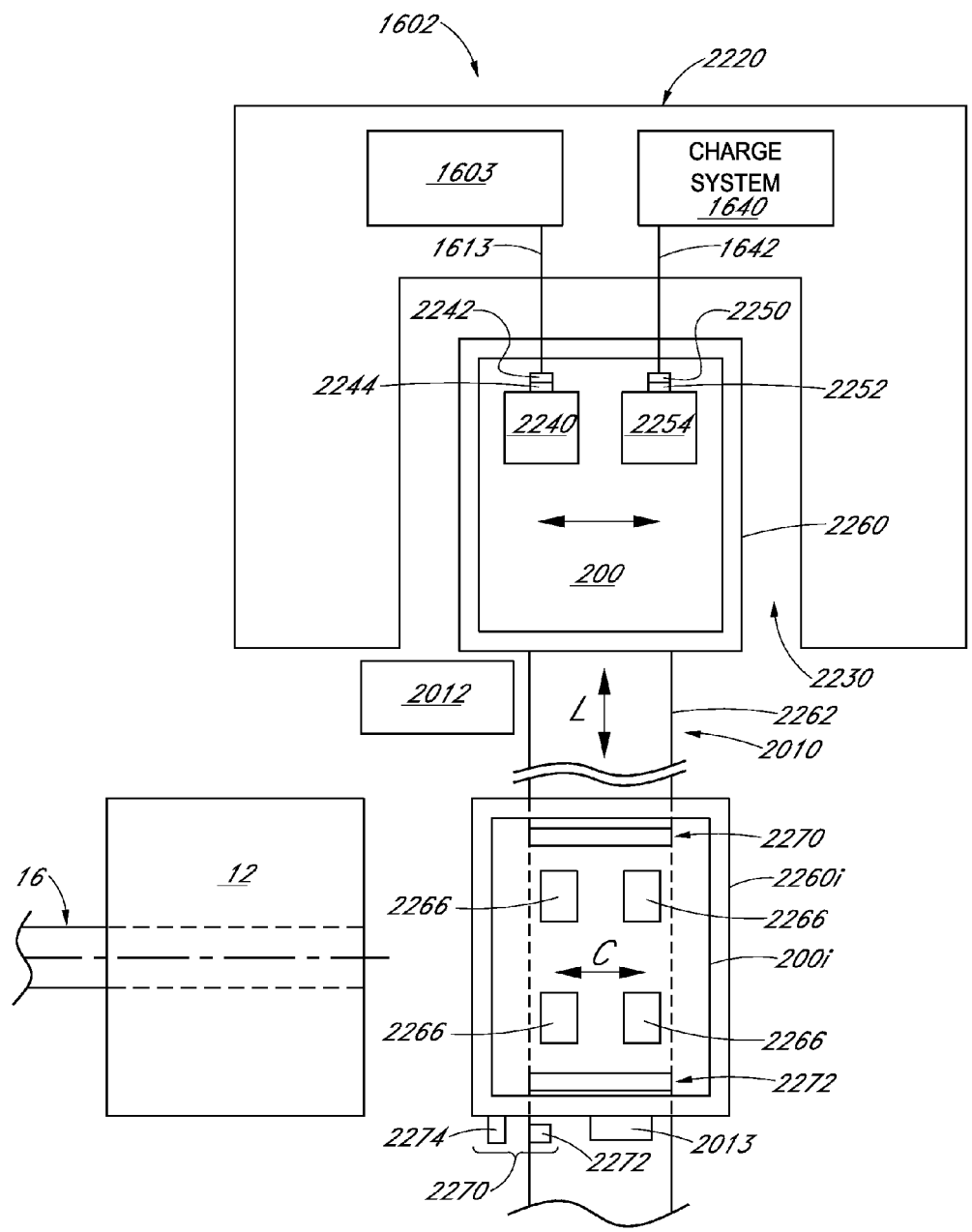
FIG. 14 is a schematic diagram of a cleaning device servicing station of FIGS. 1 and 11.

With reference to FIGS. 1, 10 and 14, the servicing station 1602 can be disposed along a conveyor path 2010. The conveyor path 2010 can be in the form of a predefined path of travel of the robot 200 as it is moved between rows of modules 12. Optionally, the conveyor assembly 2010 can be in the form of any type of conveyor system, such as a belt conveyor, variable speed belt conveyor, live roller conveyor, or other types of conveyor systems, where the conveyor assembly 2010 provides a propulsive force for moving the robot 200 between the various rows of modules 12. The conveyor assembly 2010 can include a conveyor motor 2012 which can be disposed anywhere along the conveyor assembly 2010. In the illustrated embodiment, the conveyor drive motor 2012 is disposed in the vicinity of the service station 1602. Other configurations can also be used.

With reference to FIGS. 1N and 11-13, as noted above, the controller 50 can include or be connected to the self-cleaning system 51. With reference to FIG. 11, the self-cleaning system 51 can be considered as including a scheduling module 2100, a cleaner module 2110, a row alignment module 2120, a collector alignment module 2130, a servicing module, which can be in the form of the servicing station 1602, and a conveyor control module 2140.

The scheduling module 2100 can be configured to provide overall scheduling control of the cleaning of the rows of modules 12. For example, the scheduling module 2100 can be in the form of a software module configured to operate in conjunction with the CPU 1200 of the controller 50 described above with reference to FIG. 1N and/or the microcontroller 1616. Additionally, the scheduling module 2100 can include a user interface allowing a user to choose or input scheduling data. For example, the scheduling module 2100 can include a memory device and user interface configured to allow a user to input cleaning data corresponding to a periodic schedule for cleaning the rows of modules 12 as well as an option for starting a cleaning cycle at any time. For example, a cleaning cycle could include a cycle of delivering the robot 200 to each of the rows of modules 12 in the system 10 (FIG. 1A). Additionally, the scheduling module can be configured to transport the robot 200 to one row of modules 12 at a time, check if the robot 200 contains sufficient cleaning solution and/or power to complete a cleaning of an additional row, then transport the robot 200 to another row for cleaning or return robot 200 to the servicing station 1602 if it does not have sufficient cleaning solution and/or power.

Additionally, the scheduling module 2100, or any other module, can include functionality for issuing a command to the robot 200 to begin a row cleaning cycle. For example, the robot 200 and/or the cleaner control module 2110 can be configured to receive a launch command. Further, the robot 200 and/or the cleaner control module 2110 can be configured to execute a module row cleaning cycle in which the robot 200 would launch itself from the conveyor 2010 onto a row of modules 12, traverse the row of modules 12 while cleaning the modules 12 then return to the conveyor 2010. During such a cleaning cycle, the robot 200 can operate completely or substantially autonomously as described above with reference to FIG. 2

The cleaner control module 2110 can be a software and/or hardware implemented module designed for controlling operation of the robot 200 as described above, for example, driving the motors and associated components and sensors described above with reference to the drive modules 1300, 1400, and 1500 described above with reference to FIGS. 7-9. Thus, the cleaner control module 2110 can be considered as including any embodiment of the drive modules 1300, 1400, 1500. Other configurations can also be used.

The row alignment module 2120 can be a module configured to move the robot 200 into alignment with a row of modules 12. For example, the row alignment module 2120 can include software and/or hardware configured to provide the functionality of aligning the robot 200 with predetermined positions in alignment with each of the rows of modules 12. For example, the row alignment module 2120 can be considered as including a drive of the conveyor 2010 and a device configured to determine when the robot 200 is in alignment with a row of modules 12. For example, the row alignment module 2120 can include counters or sensors configured to be usable for determining when the robot 200 is in alignment with a row of modules 12.

The collector alignment module 2130 can be configured to align the robot 200 for launch onto a row of modules 12. For example, the collector alignment module 2130 can be configured to adjust a position of the robot 200 relative to the conveyor 2010, for example, vertically and/or pivotably and/or through other directions and motions, to orient the robot 200 in a position better aligned with the row of modules 12 such that the robot 200 can move from the conveyor 2010 onto a row of modules 12 to perform a cleaning cycle. An optional embodiment of the collector alignment module 2130 is described in greater detail below with reference to FIG. 21.

The conveyor control module 2140 can include a controller for a motor for operating the conveyor 2010 whether the motor is stationary and operates a conveyor belt for example, or is mounted on a movable platform of the conveyor 2010. The conveyor control module 2140 can be activated by the scheduling module 2100.

With reference to FIG. 12, the self-cleaning system 51 can be broken down in various ways, depending on a configuration of various pieces of hardware. For example, another embodiment of the self-cleaning system, identified by the reference numeral 51A, includes a stationary mounted portion 2200, a conveyor mounted portion 2010, and a portion, such as the cleaner control module 2140 mounted on the robot 200.

Thus, in the illustrated embodiment of the self-cleaning system 51A, includes the scheduling module 2100, the row alignment module 2120, the servicing module 1602, and the conveyor control module 2140 included in the stationary portion 2200. Additionally, the self-cleaning system 51A includes the collector alignment module 2210 included in a movable portion of the conveyor 2010. Further, the robot 200 includes the cleaner control module 2140. This type of arrangement can be used in various contexts, including, for example, but without limitation, where the conveyor 2010 includes a stationary motor 2012 driving a drive train, such as a belt or chain, for moving the robot 200 into alignment with various rows of solar modules 12. As such, the conveyor control 2140 can include a driver for the motor 2012 used for moving the conveyor 2010 and the row alignment module 2120 which the conveyor control 2140 can use to confirm alignment with the various rows of modules 12.

Additionally, the conveyor 2010 can include a collector alignment module 2210 for aligning the robot 200 with a particular module 12 on the row of modules 12 such that the robot 200 can move off of the conveyor 2010 onto an upper surface of a module 12. The collector alignment module 2010 can include features for determining reference alignment and adjusting a position of the robot 200 in accordance with the determined reference alignment, discussed in greater detail below.

The cleaner control module 2140 can include hardware for controlling various devices on the robot 200, for example, the motors, sensors, and other devices described above with reference to FIGS. 7-9.

With reference to FIG. 13, a further embodiment of the self-cleaning system 51 is illustrated therein and identified generally by the reference numeral 51B. In the self-cleaning system 51B, the scheduling module 2100 and the servicing module 1602 can be included in the stationary portion 2200. The conveyor control 2140, the row alignment module 2120 and the collector alignment control 2210 can be included in the conveyor portion 2010. As in the other embodiments, the cleaner control module 2140 can be included in the robot 200. The various configurations of the self-cleaning systems 51, 51A, 51B can be used, or other configurations can be used, in the various different configurations of the systems described below.

With reference to FIG. 14, the servicing module 1602 can be in the form of a housing mounted adjacent to the conveyor 2010. Additionally, as in the embodiments described above, the servicing module 1602 can include various components and/or subsystems for servicing the robot 200. The servicing module 1602 can also include a housing 2220 configured to surround a portion of the conveyor 2010 and, when disposed therein, the robot 200. Thus, the housing 2220 includes an entry point 2230 into which a portion of the conveyor 2010 extends such that the robot 200 can be at least partially enclosed within the housing 2220.

Optionally, the housing 2220 can extend to over a top of the robot 200 when disposed therein, to further protect the robot and/or other components disposed therein from exposure to the atmosphere, weather, etc. As described above with reference to FIG. 10, the servicing module 1602 can also include a hose 1613 for refilling a cleaning solution tank 2240 disposed within the robot 200. Optionally, the service module 1602 can also include a cleaning fluid connector 2242 disposed at an end of the hose 1613 for connecting to a cleaning fluid refill port 2244 disposed on the robot. Additionally, the connector 2242 can be fixed relative to the housing 2220 such that the connector 2242 automatically connects to the port 2244 when the robot 200 is moved into the housing 2220 along the conveyor 2010. As such, the tank 2240 can be refilled without the need for a worker to manually connect the connector 2242 to the port 2244.

Similarly, the service module 1602 can include the recharging conduit 1642 and a recharging connector 2250. The connector 2250 can be configured to engage with a recharge port 2252 disposed on the robot 200 for connection to a power storage unit 2254 disposed on the robot 200. The rechargeable power unit 2254 can be in the form of any type of power unit, fuel cell, fuel tank, rechargeable battery, etc., for providing power to the robot 200 for operating the cleaner control module 2140 described above. Additionally, the connector 2250 can be fixed relative to the housing 2220 such that the connector 2250 is automatically connected to the recharging port 2252 when the robot 200 is moved into the housing 2220 by the conveyor 2010.

The conveyor 2010 can be any type of conveyor noted above. For example, in some embodiments, the conveyor 2010 is in the form of a belt or chain drive powered by a conveyor motor 2012 which can be controlled by the conveyor control module 2140 (FIGS. 11-13). As such, the motor 2012 can operate a belt or chain drive (not shown) for moving a transport platform 2060 of the conveyor system 2010 in a longitudinal direction L along a conveyor track 2262 (FIG. 1A). The robot 200 is illustrated in a displaced position identified by the reference numeral 200i to illustrate the movement of the robot 200 along the conveyor track 2262.

The conveyor track 2262 can be any type of track, including single rail, double rail, channels, or a flattened surface made from sheet material, expanded metal, or other materials, for allowing the robot 200 to roll along the track 2262. Optionally, the conveyor 2010 can include a conveyor platform 2260 configured to support the robot 200 thereupon during transportation along the track 2262 and into alignment with various rows of modules 12.

As described above, the robot 200 can be configured to roll along and clean a series of solar modules 12 mounted to a torque tube 16. The cleaning direction of the robot 200 is identified by the direction C in FIG. 14. Thus, for example, the robot 200 can include track belts, identified by the reference numerals 2270, 2272 for driving the robot 200 in the direction of arrow C, onto and off of the support 2260 and onto and off of module 12.

To confirm alignment of the robot 200 with a row of modules 12, the row alignment module 2120 can be considered as including an alignment detecting arrangement identified generally by the reference numeral 2270, configured to detect when the robot 200 is in alignment with a row of modules 12. For example, the arrangement 2270 can include an alignment marker 2272, which can be in the form of a fiducial or other types of markers, and a sensor 2274 configured to detect alignment with the marker 2272. For example, the marker 2272 can include a reflective sticker, or other type of optical marker and the sensor 2274 can include an optical sensor configured to detect the presence and/or alignment with the marker 2272. The marker 2272 can be placed in predetermined locations corresponding to alignment with the sensor 2274 when the robot 200, supported by the support 2260, is aligned with a module 12 of a particular row. A plurality of such markers 2272 can be placed along the track 2262 at all locations corresponding to alignment with the various rows of modules 12. Thus, with reference to the system 10 illustrated in FIG. 1A, the track 2260 would include eight markers 2272.

In the configuration described above with a marker 2272 on the track 2262 and the sensor 2274 on the support platform 2260, the configuration of the cleaning system 51B can be used, however, other configurations can also be used. For example, the sensor 2274 can be connected to the row alignment control module 2120 mounted on the conveyor support 2260. Additionally, in this variation, a drive motor 2013 is connected to the support platform 2260 such that the support platform 2260 is self-powered to move along the track 2262 under its own power. In this configuration, the support platform 2260 can include wheels 2266, or optionally, tracks, glides, slides, skids, or other devices for moving along the track 2262. Thus, the row alignment control module 2120 can be connected to the motor 2013 and the sensor 2274 so as to drive the motor 2013 so as to align the support platform 2260 into the desired alignment, based on the detection of the marker 2272.

Further, in some embodiments, the scheduling module 2100 can communicate with the row alignment control 2120, to issue a command to the conveyor control 2140 to drive the motor 2013 into a different alignment of the rows of modules 12 one at a time, until the support platform 2260 reaches alignment with the desired row of modules 12.

In other configurations, the box identified by the reference numeral 2272 can correspond to a sensor, one sensor being mounted adjacent to each of the rows of modules 12, and the support platform 2260 including a marker in the position identified by the reference numeral 2274. This configuration can be used in the embodiment of FIG. 12, in which the conveyor control 2140 is mounted in the stationary portion 2200 of the self-cleaning system 51A. Thus, the row alignment module 2120 can be connected to all of the sensors 2272 mounted on the track 2262 and direct operation of the conveyor control 2140, for example, with the motor 2012, to move the support platform 2260 into alignment with each of the installed sensors 2272.

Figure 15:
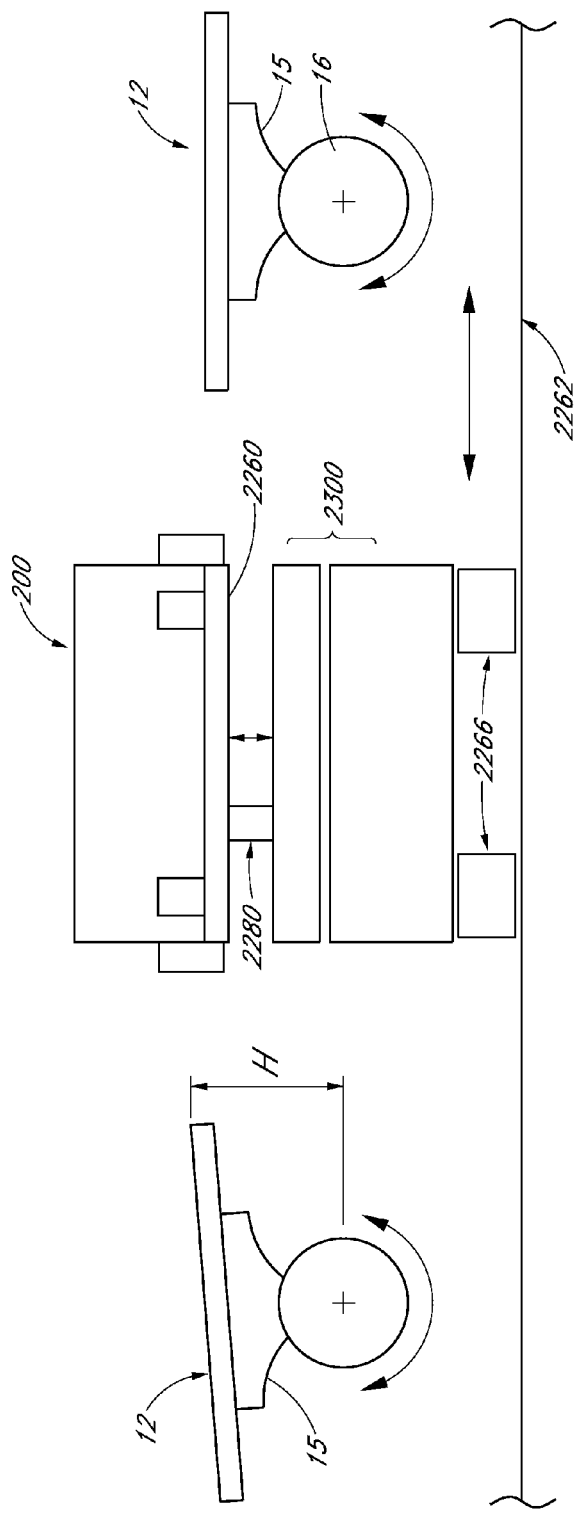
FIG. 15 is a schematic diagram of a conveyor supporting a cleaning device on a support surface and including the vertical adjustment mechanism.
Figure 16:
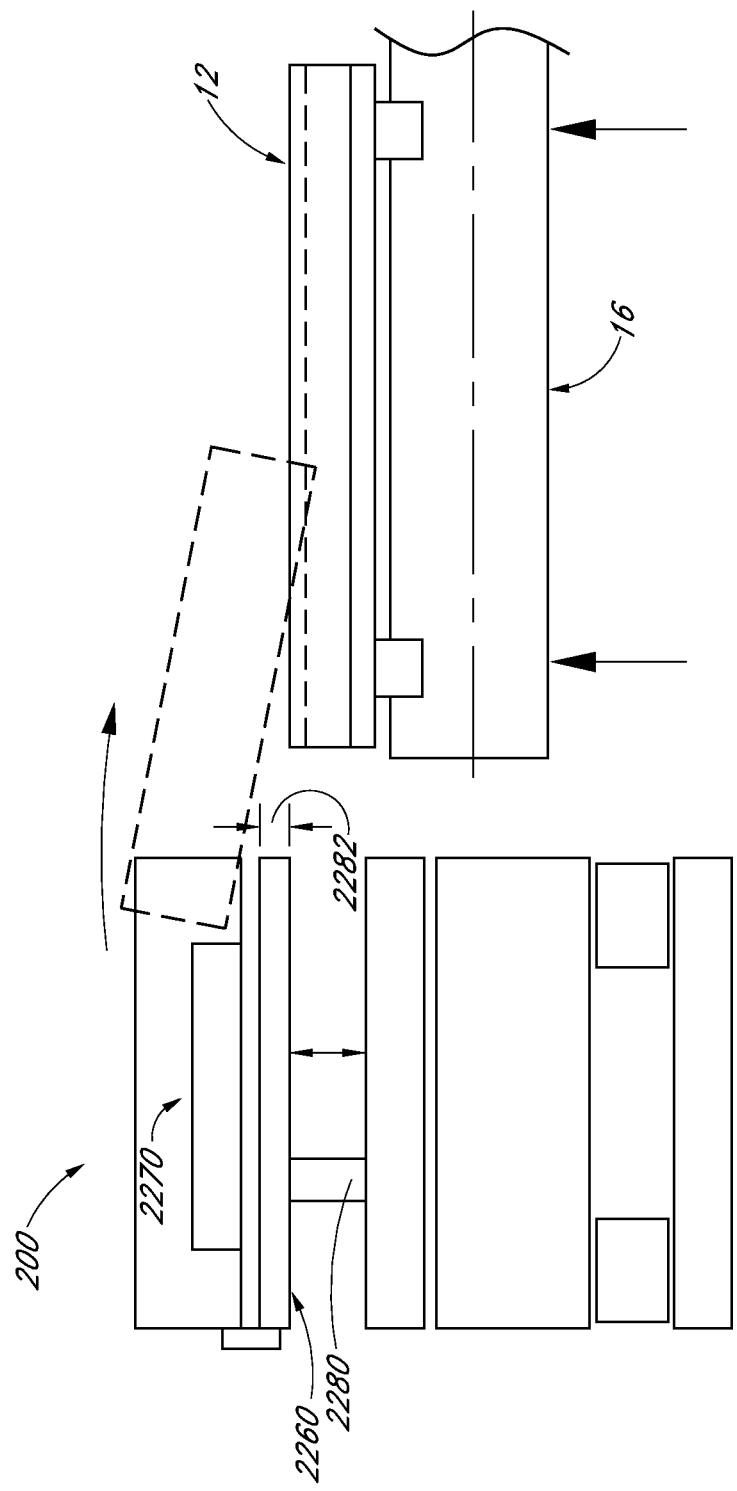
FIG. 16 is a schematic side elevational view of the conveyor of FIG. 16, illustrating a movement of a cleaning device from the conveyor device onto a solar module to be cleaned.

With reference to FIGS. 15 and 16, the self-cleaning system 51, as noted above, can include a collector alignment module 2210. In some embodiments the collector alignment module 2130 can be configured to adjust a vertical height of the robot 200 so as to improve alignment with a desired row of modules. This can be beneficial because, as noted above, in a larger solar energy collection system, such as the system 10 illustrated in FIG. 1A, the inclination of the modules 12 in each of the rows can be different, for example, due to mechanical slop and/or thermal expansion. Such variations in the inclination of the associated modules 12 thus varies from row to row.

In some systems 10, one or more of the rows of modules 12 can include an inclination sensor. Thus, for at least some of the rows of modules 12, the angular orientation of the modules 12 can be determined directly from such an inclination sensor. However, in some systems 10, not all of the rows have a dedicated inclination sensor. Thus, for some purposes, and inclination angle of a particular row of the system 10 can be determined or estimated using the equations 1-5 described above with reference to FIGS. 1I-1K.

Using the determined or estimated angle of inclination, with reference to the row of modules 12 on the left hand side of FIG. 15, a maximum height H of the upper surface of the modules 12 can be determined using known trigonometric functions. After the maximum height of the upper surface of the module 12 is determined, the collector alignment module 2130 can be used to raise the robot 200 such that the lower surface of the robot 200 is at least as high as the maximum height of the upper surface of the module 12. For example, the collector alignment module 2130 can include an actuator assembly 2280 configured to raise and lower the support platform 2260. For example, the actuator assembly 2280 can include a linear actuator and optionally a linear guide configured to guide the support platform 2260 up and down relative to a lower portion 2300 which can provide a base for mounting the vertically moveable support platform 2260 relative to the conveyor track 2262. In the illustrated embodiment, the base 2300 includes the wheels 2266 for movably supporting the base 2300 on the track 2262.

With reference to FIG. 16, with the support platform 2260 adjusted as such, the robot 200 can then, under the power of its track belts 2270, 2272, drive onto the upper surface of a module 12 that is horizontal and/or tilted relative to horizontal. Optionally, the collector alignment module 2130 can be configured to raise the support platform 2260 to a height such that the upper surface of the support platform 2260 is either equal in height or higher than the upper surface of the module 12 by a predetermined offset identified by the reference numeral 2282. Such a vertical offset can be on the order of a fraction, a substantial portion of, or an inch or more.

Figure 17:
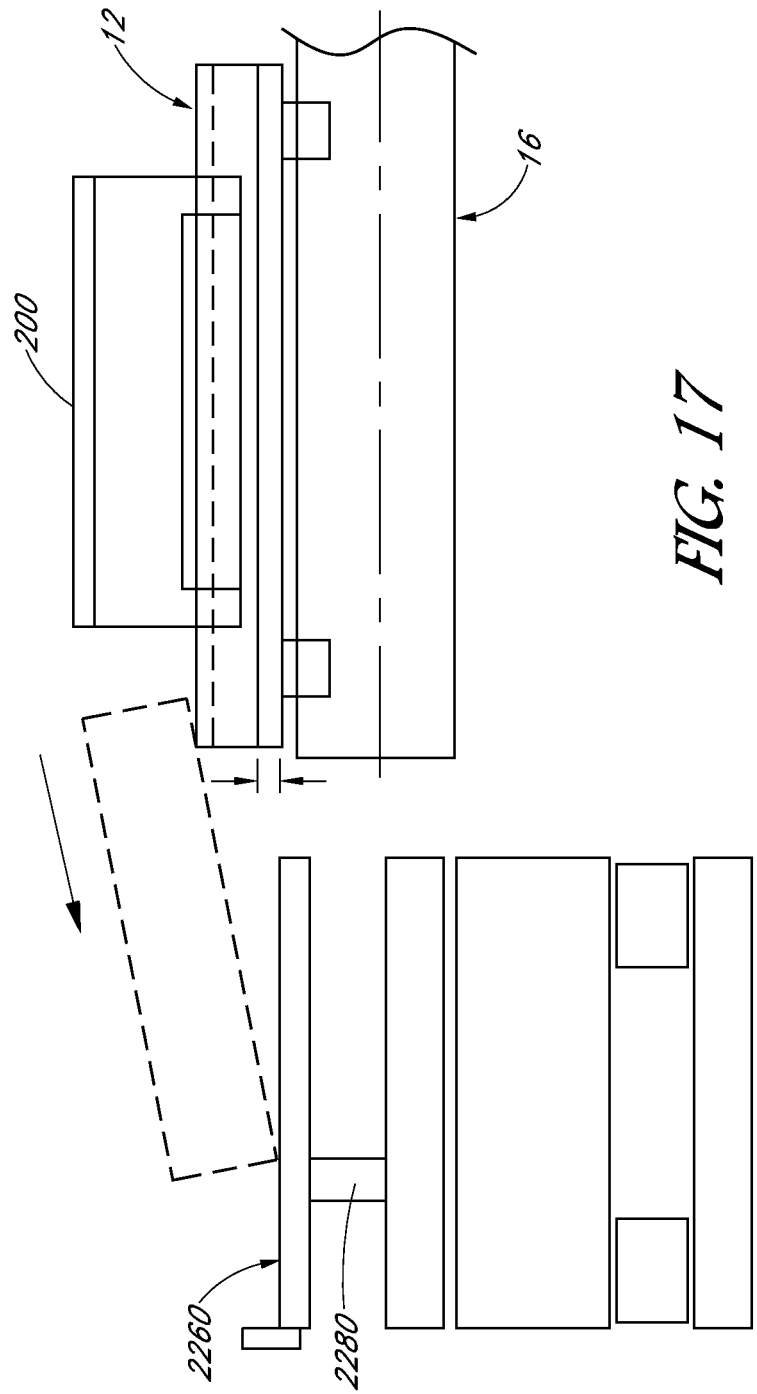
FIG. 17 is a schematic side elevational view of the conveyor and cleaning device of FIG. 16, illustrating a movement of the cleaning device from a solar module onto the conveyor.

With reference to FIG. 17, the collector alignment module 2130 can also be configured to lower the support platform 2260 such that its upper surface is lower than a lower most surface of the module 12 for purposes of allowing the robot 200 to drive off of the module 12 at the end of the row cleaning cycle. Thus, with the upper surface of the support platform 2260 lower than the lower most surface of the module 12, the robot 200 can more easily drive off of the module 12 and onto the support platform 2260.

In some embodiments, the conveyor assembly can include a tilt adjustment actuator identified generally by the reference numeral 2290. As noted above with reference to FIGS. 1L and 1M, the modules 12 mounted to the torque tube 16 moved through an arc shaped path, thereby changing an angle of inclination as well as being generally laterally displaced relative to the pivot axis of the torque tube 16.

Figure 18:
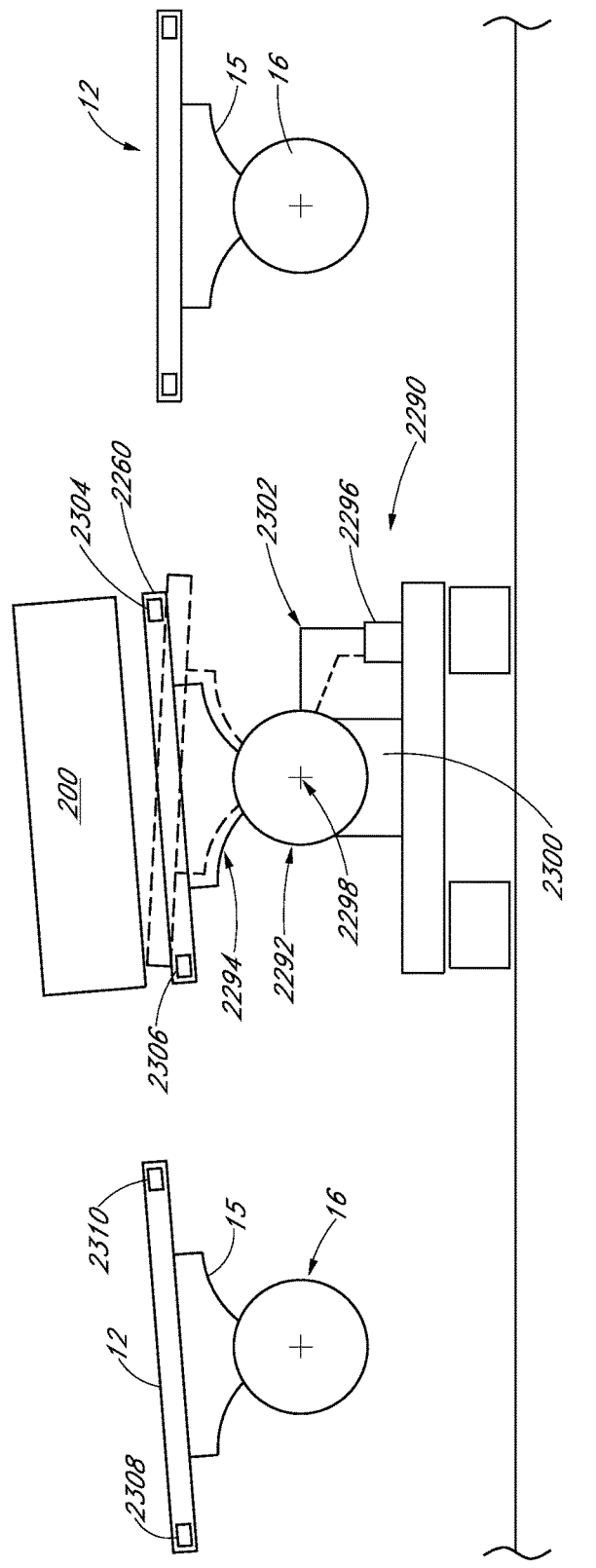
FIG. 18 is a schematic illustration of a conveyor having a tilt adjustment device for alignment of the support surface with an upper surface of a solar energy collection module.

Thus, with reference to FIG. 18, the pivot adjustment actuator assembly 2290 can include an actuator and a mechanism guide for guiding movement of the support platform 2260 through a pivoting motion. In some embodiments, the support platform 2260 can be mounted on a structure having a dimensional similarity to a torque tube 16 and support member 15 which support the modules 12 in the system 10.

For example, the pivoting actuator assembly 2290 can include a pivoting support member 2292 which can be in the form of a piece of a torque tube 16, or another component having an outer surface of approximately the same diameter as the torque tube 16. Additionally, the actuator assembly 2290 can include a support member 2294 having approximately the same dimensions as the support 15. Finally, the support platform 2260 can include a member having approximately the same dimensions as a module 12. In some embodiments, the support platform 2260 can be in the form of a solar module 12.

The actuator assembly 2290 can include a linear or rotational actuator 2296 configured to rotate the support member 2292 about any rotational axis 2298. In some embodiments, the actuator assembly 2290 can also include a bearing member 2300 which can be in the form of a bearing assembly used to support the torque tube 16 and the system 10, or another type of bearing. The actuator 2296 can be connected to a lever member 2302 such that as the actuator 2296 moves, the support member 2292 pivots about the axis 2298 and thus moves the support platform 2260 through approximately the same range of motion as a solar module 12.

Optionally, the collector alignment module 2210 can be configured to determine an angular orientation of a module 12 to be cleaned and then actuate the actuator 2296 to orient the support platform 2260 at that angle. Additionally, in some embodiments, the actuator assembly 2290 can include additional sensors, such as sensor 2304 and sensor 2306 mounted at a periphery of the support platform 2260. Similarly, one or more of the solar modules 12 can include registration markers 2308, 2310 disposed at corresponding locations at locations on the solar module 12 so as to face the senors 2306, 2304. As such, the collector alignment module 2130 can use the output from the sensor 2306, 2304 to help determine if the support platform 2260 is aligned with a solar module 12 to be cleaned.

Figure 19:
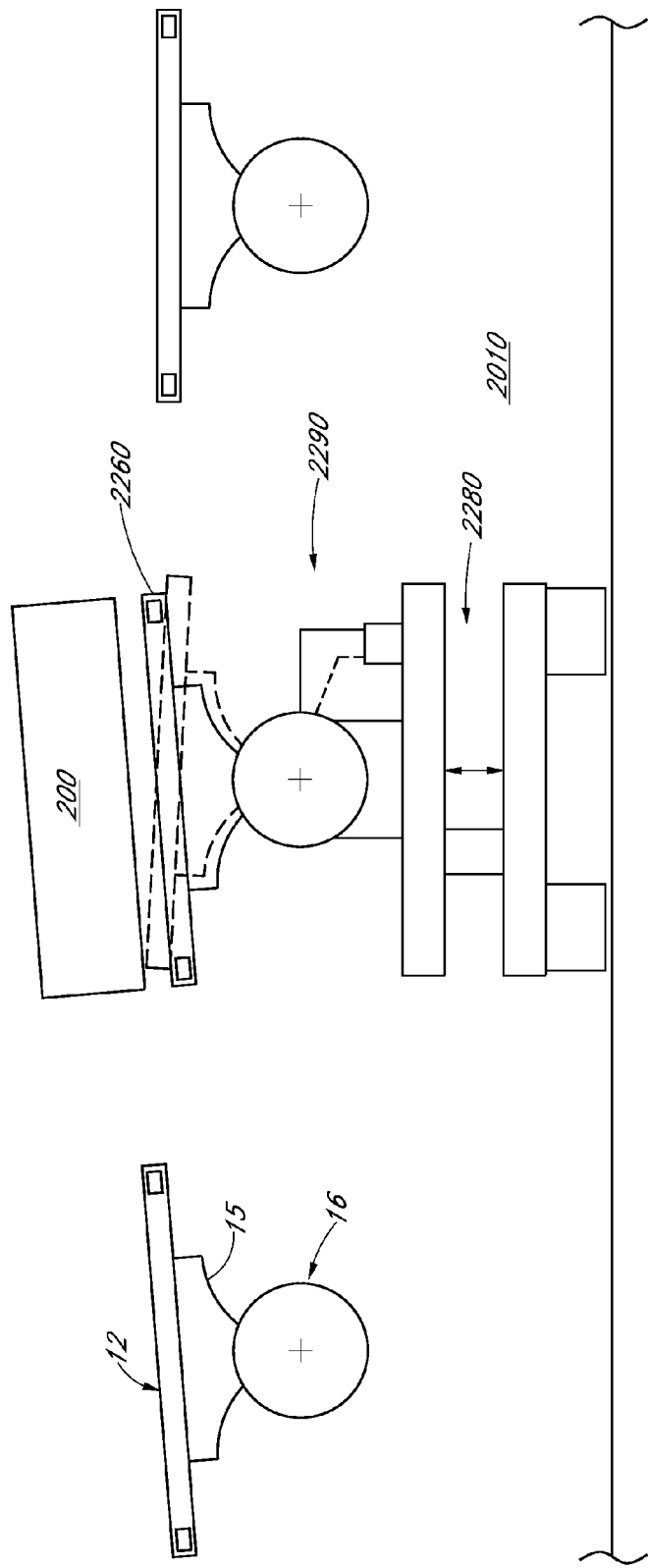
FIG. 19 is a schematic diagram of yet another embodiment of a conveyor including both vertical and tilt adjustment devices.

With reference to FIG. 19, in some embodiments, the conveyor 2010 can include both the vertical adjustment actuator 2280 and the pivotal adjustment actuator 2290 to provide further adjustments in the alignment of the support platform 2260 with the solar module 12 to be cleaned.

Figure 20:
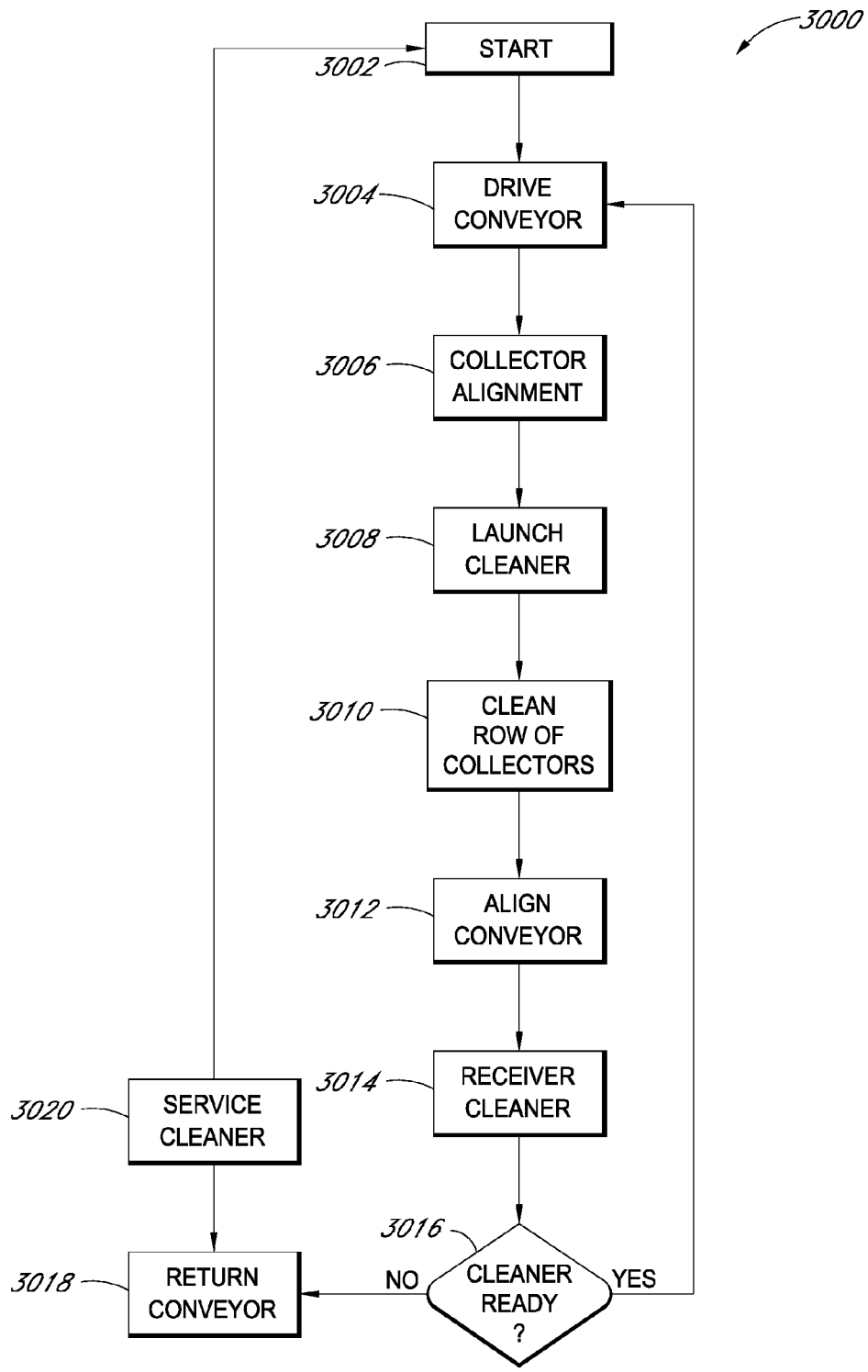
FIG. 20 is a flow chart illustrating an optional control routine that can be used for executing a self-cleaning routine for the solar energy collection system.

With reference to FIG. 20, the self-cleaning system 51 can operate under a method of operation corresponding to the flow chart at FIG. 20 which can be considered as representing a control routine 3000. The control routine 3000 can begin at operation block 3002 at any time, including, for example, according to the predetermined scheduled stored in the scheduling module 2100, or upon receiving a manual instruction to begin a cleaning cycle. After the operation block 3002, the control routine 3000 can move on to operation block 3004.

In operation block 3004, the robot 200 can be moved into alignment with a row of modules 12 to be cleaned. For example, the conveyor control module 2140 can be used to operate a drive motor associated with the conveyor 2010, such as the motor 2012 or the motor 2013 into alignment with a row of modules 12. For example, the row alignment control module 2120 can drive either the motors 2012, 2013 until alignment with the row of modules 12 is detected using a detection arrangement 2270. Other techniques can also be used. After the operation block 3004, the control routine 3000 can move on to an optional operation block 3006.

In the optional operation block 3006, the robot 200 can be further aligned with a row of modules 12 to be cleaned. For example, the collector alignment control module 2210 can use one or more actuators, such as the actuator assemblies 2280 and/or 2290 to further align the support platform 2260 with a row of modules 12 to be cleaned. After the optional operation block 3006, the control routine can move on to operation block 3008.

In the operation block 3008, the robot 12 can be launched. For example, a launch command can be issued to the robot 200, in response to which the robot 200 can drive off of the support platform 2260 onto the first of a row of modules 12 to be cleaned. After the operation block 3008, the control routine 3000 can move on to operation block 3010.

In the operation block 3010, the robot can clean a row of modules 12 and optionally, return to a position adjacent to support platform 2260. For example, the robot 200 can complete a row cleaning cycle described above. After the operation block 3010, the control routine 3000 can move on to operation block 3012.

In the operation block 3012, optionally, the support platform 2260 can be again aligned with the module 12 upon which the robot 200 stands. For example, the collector alignment control module 2210 can use the actuator 2280 and/or actuator 2290 to align the support platform 2260 with the module 12 upon which the robot 200 stands. After the operation block 3012, the control routine 3000 can move on to operation block 3014.

In the operation block 3014, the support platform 2260 can receive the robot 200. For example, the robot 200 can be instructed to drive off of the module 12 and onto the support platform 2260. After the operation block 3014, the control routine 3000 can move on to decision block 3016.

In the decision block 3016, it can be determined whether or not the robot 200 is ready for continued cleaning operations. For example, the level of cleaning solution remaining in the cleaning solution reservoir 2240 (FIG. 14) and the amount of power remaining in the power storage device 2254 can be determined. More specifically, it can be determined whether the amount of solution and the amount of power remaining are sufficient to execute a further row cleaning cycle. If it is determined that in the decision block 3016, that the robot 200 has sufficient cleaning solution and/or power to execute an additional cleaning cycle, the control routine 3000 can return to operation block 3004 and repeat. If, on the other hand, it is determined that the robot 200 is not ready for executing an additional cleaning cycle, the control routine can move on to operation block 3018.

In the operation block 3018, the conveyor 2010 can return the robot 200 to the servicing module 1602. For example, the conveyor control module 2140 can operate either of the motors 2012, 2013 to return the support platform 2260, carrying the robot 200, back to the housing 2220 into the position illustrated in FIG. 14. After the operation block 3018, the control routine 3000 can move on to operation block 3020.

In the operation block 3020, the service module 1602 can service the robot for preparation of further cleaning routines. For example, the robot 200 can be moved into position such that the connector 2242 connects with the port 2244 and/or the connector 2250 connects with the recharge port 2252. As such, the service module 1602 can refill the robot 200 with cleaning solution and recharge the robot with power for subsequent cleaning cycles.

After the operation block 3020, the routine 3000 can return to the operation block 3002 and repeat.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A self-cleaning solar energy system comprising:
a plurality of rows of sun-tracking, solar energy collection devices, each row comprising a plurality of solar energy devices having optical surfaces aligned with each other;
a self-propelled cleaning mechanism comprising:
  a drive system configured to propel the cleaning mechanism across the optical surfaces,
  at least one cleaning member configured to remove debris from the optical surfaces as the cleaning mechanism moves across the optical surfaces,
  a liquid reservoir,
  a liquid output port connected to the liquid reservoir and configured to discharge liquid from the reservoir toward the optical surfaces as the cleaning mechanism moves across the optical surfaces, and
  a power supply connected to the drive system and configured to supply power to the drive system;
a conveyor extending proximate to ends of the plurality of rows, the conveyor comprising a conveyor drive configured to move the cleaning mechanism proximate to the ends of each of the plurality of rows;

a cleaning mechanism receiver positioned along the conveyor and including a receiver assembly configured to be adjustable in height and angle relative to at least one of the plurality of rows in order to receive the cleaning mechanism from the conveyor on an upper surface thereof; and a controller connected to the conveyor drive and configured to control the conveyor drive to move the cleaning mechanism from the cleaning mechanism receiver and into alignment with the ends of each of the rows.

2. The self-cleaning solar energy system according to claim 1, wherein the cleaning mechanism receiver comprises a liquid refilling mechanism including a liquid discharge port configured to discharge liquid into the liquid reservoir when the cleaning mechanism is positioned on the cleaning mechanism receiver.

3. The self-cleaning solar energy system according to claim 2, wherein the liquid reservoir comprises a liquid refill port connected to the liquid reservoir, and wherein the liquid discharge port is configured to engage with the liquid refill port.

4. The self-cleaning solar energy system according to claim 3, wherein liquid refilling mechanism comprises at least one of a valve mechanism and a pump fluidically connected to the liquid discharge port, the controller being connected to the at least one of the valve and the pump and configured to control operation of the at least one of the valve mechanism and pump between an idle state in which no liquid is discharged from the liquid discharge port and a refill state in which liquid flows through the liquid discharge port.

5. The self-cleaning solar energy system according to claim 1, wherein the power supply comprises a rechargeable power supply, wherein the cleaning mechanism receiver comprises a recharger mechanism comprising a recharging connector configured to connect to and recharge the rechargeable power supply.

6. The self-cleaning solar energy system according to claim 5, wherein the rechargeable power supply comprises a power input connector configured to engage with the recharging connector.

7. The self-cleaning solar energy system according to claim 6, wherein the recharger mechanism is connected to the controller, and the controller is configured to determine an amount of remaining power in the rechargeable power supply and to move the cleaning mechanism to the recharger mechanism if the rechargeable power supply has less power than necessary to twice traverse an entire length of one of the rows.

8. The self-cleaning solar energy system according to claim 7, wherein the controller is configured to determine the amount of power remaining by at least one of counting a number of rows the cleaning mechanism has cleaned, timing how long the cleaning mechanism has been away from the recharger mechanism, and wireless communication with the cleaning mechanism.

9. The self-cleaning solar energy system according to claim 1, wherein the cleaning mechanism receiver comprises a support assembly configured to travel along the conveyor and configured to support the receiver assembly.

10. A cleaning system for a solar energy system comprising:
a conveyor extending proximate to ends of a plurality of rows of sun-tracking, solar energy collection devices, each row comprising a plurality of solar energy devices having optical surfaces aligned with each other, the conveyor comprising a conveyor drive configured to move a self-propelled cleaning mechanism proximate to the ends of each of the plurality of rows a plurality of rows;

the self-propelled cleaning mechanism comprising:
a drive system configured to propel the cleaning mechanism across the optical surfaces,
at least one cleaning member configured to remove debris from the optical surfaces as the cleaning mechanism moves across the optical surfaces,
a liquid reservoir,
a liquid output port connected to the liquid reservoir and positioned to discharge liquid from the reservoir toward the optical surfaces as the cleaning mechanism moves across the optical surfaces, and
a power supply connected to the drive system and supplying power to the drive system;
a cleaning mechanism receiver positioned along the conveyor and including an upper platform configured to be adjustable in height and angle relative to at least one of the plurality of rows in order to receive and support the cleaning mechanism on an upper surface thereof; and
a controller connected to the conveyor drive and configured to control the conveyor drive to move the cleaning mechanism from the cleaning mechanism receiver and into alignment with the ends of each of the rows.

11. The cleaning system for a solar energy system according to claim 9, wherein the conveyor comprises a cleaning mechanism receiving stage engaged with the conveyor such that the conveyor drive can move the cleaning mechanism receiving stage into alignment with each of the plurality of rows.

12. The cleaning system for a solar energy system according to claim 11, wherein the cleaning mechanism receiving stage comprises at least one alignment sensor configured to detect alignment of the cleaning mechanism receiving stage and at least one solar energy device of each of the plurality of rows and to output a signal indicative of alignment.

13. The cleaning system for a solar energy system according to claim 12, wherein the alignment sensor is connected to the controller, the controller being configured to signal the cleaning mechanism to initiate movement from the cleaning mechanism receiving stage onto an adjacent optical surface of one of the plurality of rows only after receiving a signal from the alignment sensor indicating that the cleaning mechanism receiving stage is aligned with the optical surface.

14. The cleaning system for a solar energy system according to claim 11, wherein the controller is configured to drive the conveyor to move the cleaning mechanism receiving stage in a reciprocating manner, alternating between aligning the cleaning mechanism receiving stage with one of the plurality of rows and a parking location.

15. A method of cleaning a solar power system, the method comprising:
conveying, with a conveyor, a self-propelled cleaning mechanism disposed on an upper surface of a receiver assembly of a cleaning mechanism receiver to a first row of a plurality of rows of solar energy collection devices, the receiver assembly being configured to be adjustable in height and angle relative to the first row of the plurality of rows of solar energy collection devices;
detecting when the self-propelled cleaning mechanism is aligned with the first row;

propelling the cleaning mechanism, after detecting alignment of the self-propelled cleaning mechanism and the first row, from the cleaning mechanism receiver onto the first row;
cleaning the first row with the cleaning mechanism; and
receiving at the upper surface of the receiver assembly of the cleaning mechanism receiver by operation of the conveyor after the cleaning step.

\* \* \* \* \*